US012720266B2

(12) United States Patent
Johansson et al.

(10) Patent No.: US 12,720,266 B2
(45) Date of Patent: Aug. 25, 2026

(54) BONE ANCHORED HEARING AID DEVICE UNIT

(71) Applicant: Oticon Medical A/S, Smørum (DK)

(72) Inventors: Martin Johansson, Askim (SE); Johannes Kocher, Askim (SE); Matthias Carlsson, Askim (SE); Vikram Shetty, Askim (SE); Johan Rosengren, Askim (SE)

(73) Assignee: OTICON MEDICAL A/S, Smørum (DK)

( * ) Notice: Subject to any disclaimer, the term of this patent is extended or adjusted under 35 U.S.C. 154(b) by 176 days.

(21) Appl. No.: 18/631,122

(22) Filed: Apr. 10, 2024

(65) Prior Publication Data

US 2024/0348998 A1 Oct. 17, 2024

(30) Foreign Application Priority Data

Apr. 13, 2023 (EP) .................................... 23167705

(51) Int. Cl.
*H04R 17/00* (2006.01)
*H04R 25/00* (2006.01)

(52) U.S. Cl.
CPC ........... *H04R 25/606* (2013.01); *H04R 17/00* (2013.01); *H04R 25/65* (2013.01); *H04R 2225/67* (2013.01)

(58) Field of Classification Search
CPC ...... H04R 25/606; H04R 25/65; H04R 17/00; H04R 2225/67; H04R 2460/13
See application file for complete search history.

(56) References Cited

U.S. PATENT DOCUMENTS

| | | | | |
|---|---|---|---|---|
| 2,239,550 | A | 4/1941 | Cubert | |
| 12,167,205 | B2 * | 12/2024 | Bergs | H04R 17/00 |
| 2018/0279061 | A1 * | 9/2018 | Walraevens | H04R 25/606 |
| 2020/0238062 | A1 | 7/2020 | Oplinger et al. | |
| 2021/0176574 | A1 * | 6/2021 | Bergs | H04R 25/65 |
| 2025/0106572 | A1 * | 3/2025 | Bergs | H04R 25/65 |

FOREIGN PATENT DOCUMENTS

WO 2022/141827 A1 7/2022

OTHER PUBLICATIONS

Yu Han et al: "A novel Bird-Shape Broadband Piezoelectric Energy Harveser for Low Frequency Vibrations", Micromachines, vol. 14, No. 2, Feb. 10, 2023 (Feb. 10, 2023), p. 421, XP093182157.

* cited by examiner

*Primary Examiner* — Suhan Ni
(74) *Attorney, Agent, or Firm* — Birch, Stewart, Kolasch & Birch, LLP

(57) ABSTRACT

Disclosed herein are embodiments of a bone anchored hearing aid device unit having a housing and an actuator having a first plate piezo element and a first counterweight. The unit further includes a clamp system configured for attaching the actuator or part of the actuator to the housing. The clamp system clamps the first plate piezo element of the actuator at a first clamp position at the first plate piezo element and at a second clamp position at the first plate piezo element, and in that the first counterweight is positioned between the first clamp position and the second clamp position.

17 Claims, 26 Drawing Sheets

BONE ANCHORED HEARING AID DEVICE UNIT

TECHNICAL FIELD

The present disclosure relates to a bone anchored hearing aid device unit comprising a housing and an actuator having a first plate piezo element and a first counterweight, and a clamp system configured for attaching the actuator or part of the actuator to the housing.

BACKGROUND

Bone anchored hearing aid devices are applied for the rehabilitation of patients suffering from hearing losses for which traditional hearing aids are insufficient.

A typical bone anchored hearing aid device, which may be in general called percutaneous bone anchored hearing aid device, comprises an implant unit comprising a skin-penetrating abutment and an external unit provided with a sound processor and an actuator, the actuator being connected to the abutment through a coupling.

An alternative bone anchored hearing aid device, which may be in general called transcutaneous bone anchored hearing aid device, comprises an external unit comprising a sound processor and an implant unit in which an actuator is arranged.

A common actuator is an electromagnetic transducer which has a rather narrow resonance peak, where efficiency and sound output is highest. This resonance peak is normally designed to be around 1000 Hz, and this results in limited maximal sound transfer at low frequencies below 600 Hz and very high frequencies above 3000 Hz. The human brain needs to process vibration and sound between 500 Hz and 8000 Hz to process speech in a good way. An actuator for a bone anchored hearing aid device having a wider frequency range is therefore desired.

Also, the efficiency of the actuator or the several actuators need to be as high as possible. In particular, for transcutaneous bone anchored hearing aid device, it is desired to optimize the force output at particular frequencies, while minimizing energy transfer over the link through the skin. While trying to optimize these parameters, identifying an optimum is rather problematic, as the input from the user is very subjective and is therefore not adequate as objective reference for the parameter adjustment in general.

Against this background, there is a need to provide a solution that addresses at least some of the above-mentioned problems.

SUMMARY

The object named above is solved in accordance with the present disclosure by a bone anchored hearing aid device unit comprising a housing and an actuator having a first plate piezo element and a first counterweight, and a clamp system configured for attaching the actuator or part of the actuator to the housing, characterized in that the clamp system clamps the first plate piezo element of the actuator at a first clamp position at the first plate piezo element and at a second clamp position at the first plate piezo element, and in that the first counterweight is arranged on one side of one of the first plate piezo element and is positioned between the first clamp position and the second clamp position.

For a bone anchored hearing aid device, the optimum force output would be as high as possible and as equal over frequency as possible. When creating a force output/vibration/sound with a plate piezo element that is clamped, there is—due to mechanical and electromechanical mechanisms—always a high force output at high frequencies. This additional output is not needed and only creates energy losses and heat that will increase the temperature in the implant unit.

The purpose of the counterweight is to reduce the resonance frequency and increase the force output with a significantly smaller deflection of the plate piezo element. The concept of the design is to have a simple counterweight spring system, where the plate piezo element acts as both the spring and the engine.

The herewith proposed design of a bone anchored hearing aid device presents several clamping principles, boxing in of the piezo, allowing making the overall size of the implant unit as small as possible.

It is to be mentioned that the bone anchored hearing aid device unit can be the external unit of a percutaneous bone anchored hearing aid device, which external unit may be in general called "sound processor", or a subcutaneous implanted unit of a transcutaneous bone anchored hearing aid device.

Furthermore, another constraint to the bone anchored hearing aid device is the power consumption. Currently power is supplied analog to the actuator, which results in a movement of the plate piezo element and a force output. Providing the actuator with several plate piezo elements requires a more advanced energy transfer algorithms for lowering the power consumption of the bone anchored hearing aid device. The present disclosure improves the power consumption of the bone anchored hearing aid device when including multiple actuators for increasing the frequency range of the vibrations.

Variations of the bone anchored hearing aid device unit are described in the following, wherein the individual features may be combined with each other.

The bone anchored hearing aid device unit may be an implant unit configured to be implanted subcutaneously into a patient, or at least a part of the implant unit.

The bone anchored hearing aid device unit may be provided in a manner, wherein the first counterweight is arranged substantially centered with respect to the first clamp position and the second clamp position.

Centering the counterweight with respect to the clamping position opens the possibility of distributing the mass of the counterweight over the distance or surface of the plate piezo element comprised between the first and the second clamp positions, generating more than one resonant frequency and controlling the resonant frequency. It is preferable that the counterweight is attached to the plate piezo element to make sure that it does not fall or offset during the vibrational movement of the plate piezo element.

In certain implementations, it may be advantageous to use a first counterweight and a second counterweight, such as for space constraints or improved balancing to reduce or prevent offset.

The bone anchored hearing aid device unit may be provided in a manner, wherein the actuator comprises a second counterweight, the first counterweight and the second counterweight being provided on said one side of the first plate piezo element.

Alternatively, the actuator comprises a second counterweight, the first counterweight and the second counterweight being provided on different sides of the first plate piezo element. The different sides can be, for example, the at one side and the another side of the first plate piezo element.

As an example, the first counterweight can be arranged on a top side of the first plate piezo element and the second counterweight can be arranged on a bottom side of the first plate piezo element.

When the first counterweight and the second counterweight are provided on said one side of the first plate piezo element, the first clamp position, the first counterweight, the second counterweight and the second clamp position may be aligned. Additionally, each counterweight can be arranged substantially centered between one clamp position and the geometrical center of the side of the plate piezo element.

Alternatively, the first counterweight may be arranged with a shorter distance to the first clamp position in comparison to the distance between the first counterweight and the geometrical center of the side of the plate piezo element. In implementations where a single counterweight is discussed, there may be advantages to replacing the single counterweight with a first counterweight and a second counterweight.

Different combinations of masses and its varied combination of placements on the first plate piezo element have been investigated to vary the resonant frequency and generate more than one resonant frequency.

The bone anchored hearing aid device unit may be provided in a manner, wherein the first plate piezo element has a carrier body and at least one active layer arranged on the carrier body. The thickness of the carrier body is chosen in dependence of a bending degree for the actuator. In particular, the relation between the thickness of the carrier body, the mechanical properties of the plate piezo element and the resonance frequency of the actuator is expressed with $$f = k \times \frac{\text{Thickness carrier body} + 2(\text{thickness of the plate piezo element})}{(\text{free length of the plate piezo element})^2} \times \sqrt{\frac{\text{Average young modulus}}{\text{Average density}}}$$

wherein k is a factor comprised in the range from 0.3 to 0.48 and f is the resonance frequency.

The carrier body may be provided with a thickness comprised in the range from 100 μm to 500 μm and may contain ceramic or metal (for example brass). The carrier body may be chosen as thin as possible without breaking under the force generated (amplified with the weight).

The material composition of the carrier body may be chosen in dependence of the number of active layers provided, the respective weight of the at least one active layer, and a total weight of the actuator. As an example, the first plate piezo element may be provided with 1 to 25 active layers per side. The individual active layers may be provided with a thickness comprised in the range 20 μm to 500 μm.

The bone anchored hearing aid device unit may be provided in a manner, wherein one active layer is arranged on each of two opposite sides of the carrier body.

In order to achieve the desired resonance frequency and force output suitable for a bone anchored hearing aid device, the material of the first plate piezo element should be chosen depending on its mechanical properties, in particular the chosen material should have a relatively high efficiency in translating electrical energy into mechanical energy. If a carrier material, to place the piezo active material on both sides of the carrier, is needed, the carrier material must be thin for easier bending and to decrease the overall height of the assembly.

In particular, a combination of the material composition of the plate piezo element or of the carrier body, the thickness, the length, the weight and the dimensions/the number of layers that results in the highest force output with a resonance peak at a frequency comprised in the range from 500 to 1000 Hz is sought. Also, the properties of the plate piezo element and the number and properties of counterweight should allow for the plate piezo element to move the counterweight for producing a vibration without damage of the actuator. Finally, the capacitance of the actuator should be low enough for allowing driving the actuator with relatively low energy.

The bone anchored hearing aid device unit may be provided in a manner, wherein the housing has a receiving space for hosting the actuator, wherein the first plate piezo element is arranged within the receiving space of the housing, and wherein the shape of the first plate piezo element is adapted to the shape of the receiving space of the housing.

The bone anchored hearing aid device unit may be provided in a manner, wherein the shape of the first piezo element is chosen in dependence of a dynamic force output over frequency and/or in dependence of the position of the actuator behind the ear when implanted.

The bone anchored hearing aid device unit may be provided in a manner, wherein the first piezo element has a shape with an outline that is, at least in particular, circular, ellipsoid, octaeder, rectangular, or squared.

The shape of the first plate piezo element can be defined both by the force output over frequency and by the placement of the implant behind the ear. Ellipsoid and squares/rectangles with cut corner resulting in octaeders can deliver improved force output behavior at high frequency with lower "ripple" effects of multiple high frequency resonances. They can therefore have improved force output frequency behavior compared to purely circular, squared or rectangular shapes.

It can be advantageous that the shape of the piezo based implant is either completely round or has rounded corners. A rounded shape allows for avoiding damaging human tissue at the periphery of the implant. A piezo that has rectangular/squared shape with sharp corners would increase the overall size of the implant and damage the human tissue at the edges.

The bone anchored hearing aid device unit may be provided in a manner, wherein the thickness and shape of the first plate piezo element is determined in dependence of a position behind the ear that the hearing device is aimed to be positioned to when implanted.

When the bone anchored hearing aid device unit is an implant, placement of the first plate piezo element behind the ear can be restricted by the shape of the head, as flat implants with big size will have difficulties with following the heads curvature. While there is an area behind the ear canal, where the skull surface is relatively flat, there is a sharp curvature inwards just below the ear canal. An implant that would surpass the flat area and reach into the curvature area would be clearly visible bulging out from the head, with low comfort and negative aesthetic appearance. Piezo benders are most commonly flat. Piezo based implants benefit therefore from flat areas on the skull. Flat implants can also be easily adjusted in placement of the head, both placement but also rotational. The user will benefit from implants that are based as close to the ear canal as possible as the vibration/sound path from the implant to the cochlear is reduced.

For aesthetical reasons, the thickness of the implant is, in general, limited around 5 mm, since a thicker implant would visibly bulge out the skin. In order to allow the overall thickness of the implant to include the wall thickness of the housing, the thickness of the plate piezo element and the height of counterweight, the plate piezo element may be provided with a thickness comprised in the range 0.5 to 3 mm, in particular 1.2 mm. The height of the counterweight can be e.g. of 3 mm.

The bone anchored hearing aid device unit may be provided in a manner, wherein the housing has an upper housing part and a bottom housing part, wherein the upper housing part and the lower housing part form the receiving space for hosting the actuator, wherein the clamp system is configured for attaching the first plate piezo element of the actuator to the bottom housing part. In certain implementations, the first counterweight can be used. In certain embodiments, a first counterweight and a second counterweight can be used with this configuration. The first counterweight and the second counterweight can be provided on said one side of the first plate piezo element. The first counterweight and the second counterweight can be provided on different sides of the first plate piezo element.

Accordingly, the housing can be opened, e.g. by removing the upper housing part, without affecting the clamping of the plate piezo element to the bottom housing part, thus facilitating maintenance of the hearing aid device unit.

The bone anchored hearing aid device unit may be provided in a manner, wherein the actuator has a first plate piezo element and a second plate piezo element, the first plate piezo element and the second plate piezo element being provided with a joint base and in parallel, or wherein the actuator has a first plate piezo element and a second plate piezo element, the first plate piezo element and the second plate piezo element being provided independently next to each other. In certain implementations, the first counterweight can be used. In certain embodiments, a first counterweight and a second counterweight can be used with this configuration. The first counterweight and the second counterweight can be provided on said one side of the first plate piezo element. The first counterweight and the second counterweight can be provided on different sides of the first plate piezo element.

It has been found in the frame of the present disclosure that more than one plate piezo element can be used to create resonant frequencies at different frequency ranges. By having several plate piezo elements in parallel on a joint base/or next to each other without a mutual base, multiple resonance frequencies can be obtained with a minimal size increase of the bone aid device. Multiple resonance peaks can be generated, resulting in a wider frequency range with high output and high-power efficiency. This can be achieved by having different lengths and the same mass on the elements or by having equal lengths and different masses. The latter case is equivalent to using the same spring geometrical design but using different materials to have different spring coefficients. Alternatively or additionally, the same effect can be achieved with e.g. two plate piezo elements, wherein the plate piezo elements have different length and/or materials.

If there is enough space, multiple plate piezo elements (5, 10, 20 etc.) may be placed resulting in resonance frequency for each plate piezo element. The benefit with this is that the sum of all resonance peaks results in a force output curve may be designed for optimal vibration transmission (e.g., less prominent and spiky resonance peaks, broader high FO frequency range).

The bone anchored hearing aid device unit may be provided in a manner, wherein the first plate piezo element and the second plate piezo element have different lengths and each of the first plate piezo element and the second plate piezo element are respectively provided with similar total weight of counterweight, or wherein the first plate piezo element and the second plate piezo element have substantially similar lengths and each of the first plate piezo element and the second plate piezo element are respectively provided with different total weights of counterweight.

The bone anchored hearing aid device unit may be provided in a manner, wherein the first plate piezo element and the second plate piezo element have different piezo-electromechanical properties.

The bone anchored hearing aid device unit may be provided in a manner, wherein the material composition and the length of the first plate piezo element is determined to adjust the position of the resonance frequency of the actuator in the frequency spectrum.

Investigations performed in relation with the present disclosure have demonstrated that the position of the resonance frequency is determined by the specific piezo material and the length of the first plate piezo element whereas the magnitude of the resonance peak is primarily governed by the width of the first plate piezo element. The dynamic force output is dependent on the weight added to the first plate piezo element and the weight also influences the resonance frequency, e.g., in the same manner as described above, with the formulae $$f = k \times \frac{\text{Thickness carrier body} + 2(\text{thickness of the plate piezo element})}{(\text{free length of the plate piezo element})^2} \times \sqrt{\frac{\text{Average young modulus}}{\text{Average density}}}$$

Accordingly, changes in the material composition or density and young modulus, as well as changes in the length of the plate piezo element result in a change in resonance frequency f.

As an example, the plate piezo element may be provided with a free length comprised in the range 5 to 35 mm.

The bone anchored hearing aid device unit may be provided in a manner, wherein the width of the first plate piezo element is chosen so as to obtain a certain magnitude of the resonance peak of the first plate piezo element.

The width of the plate piezo element should be smaller than the length of the plate piezo element, in order to avoid transversal excitation modes, i.e. avoid standing waves and/or resonances that are stronger in the width direction in comparison to the length direction of the plate piezo element.

Using the parameters material, length width and added mass, any force output configuration can be achieved. For example, the first plate piezo element can be in the length of 20-25 mm with as little as 2 g added to create a resonance frequency of 900 Hz. The same results can be achieved with the same material with a length of 15 mm with a weight of 15 g. Width up to the same measurement as the length, creating a squared piezo element can increase the force output significantly.

The bone anchored hearing aid device unit may be provided in a manner, wherein the dynamic force output of the actuator is determined by the weight of the first counterweight. As an example, the first counterweight may be provided with a weight comprised in the range 0 to 20 g, in particular in the range 0 to 15 g. A weight above 15 g may be perceived as uncomfortable to wear or be implanted by the patient.

The following hearing aid designs all present the advantage of allowing a vibration of the plate piezo element and, at the same time, of an attachment of the plate piezo element for a controlled vibration.

The bone anchored hearing aid device unit may be provided in a manner, wherein the first clamp position is arranged opposite to the second clamp position, wherein the first clamp position is arranged within a first peripheral zone of at least one of the first and second plate piezo element, and wherein the second clamp position is arranged within a second peripheral zone of at least one of the first and second plate piezo element.

The benefits of the middle-mass configuration in comparison with, e.g. a design where counterweights are arranged on the sides of the plate piezo element are, among other: enhanced manufacturability and stability of assembly by clamping, possibility of using multiple counterweight on the plate piezo element.

A proposed embodiment of the bone anchored hearing aid device unit involves clamping the first plate piezo element (which has a rectangular, elliptic, circular, square or arbitrary shape) at both the ends (laterally) with a mass in the center (medially). The purpose of the mass is to lower the resonance frequency and increase the force output with a significantly smaller deflection of the first plate piezo element. The aim here is to have a simple mass spring system, where the first plate piezo element acts as both the spring and engine. Clamping it on the sides opens the possibility of distributing the mass, generating more than one resonant frequency, and controlling the resonant frequency.

The bone anchored hearing aid device unit may be provided in a manner, wherein the clamp system has a first clamp element and a second clamp element, wherein the first clamp element clamps at least one of the first and second plate piezo element at the first clamp position, and wherein the second clamp element clamps the first plate piezo element at the second clamp position.

In a particular embodiment, the first clamp element comprises a first clamp part and a first clamp counterpart, the second clamp element comprises a second clamp part and a second clamp counterpart.

The bone anchored hearing aid device unit may be provided in a manner, wherein the clamp system has a clamp part contacting at least one of the first and second plate piezo element on a first side, wherein the clamp system has a clamp counterpart contacting the at least one of the first and second first plate piezo element on a second side opposite to the first side, wherein the clamp part contacts the first side with a closed contact line, and wherein the closed contact line connects the first clamp position and the second clamp position.

For example, disclosed herein are embodiments of a bone anchored hearing aid device unit comprising a housing, an actuator having a first plate piezo element, a second plate piezo element, and a first counterweight, and a clamp system configured for attaching the actuator or part of the actuator to the housing. The clamp system has a clamp part contacting at least one of the first and second plate piezo element on a first side. The clamp system has a clamp counterpart contacting the at least one of the first and second first plate piezo element on a second side opposite to the first side. The clamp part contacts the first side with a closed contact line. The closed contact line connects a first clamp position and a second clamp position. In other words, the closed contact line connects end points. In other words, the closed contact line can have endpoints. The end points can be construed as the first clamp position can the second clamp position.

The first plate piezo element and the second plate piezo element can be provided with a joint base and in parallel. The first plate piezo element and the second plate piezo element can be provided independently next to each other.

In certain implementations, the clamp system contacts the at least one of the first and second plate piezo element with a closed contact line, the closed contact line being curved.

The closed contact line can include end points. The first counterweight can be arranged on one side of one of the first plate piezo element and can be positioned between the endpoints of the closed contact line.

Accordingly, instead of providing separate clamps, the plate piezo element can be clamped by closing the housing, in particular when the first clamp part is attached to an upper housing part and the clamping counterpart is attached to a bottom housing part. In this configuration, the plate piezo element is sandwiched, at a peripheral zone, between the clamp part and the clamp counterpart. The first counterweight and/or the second counterweight can be incorporated into this configuration.

Accordingly, the closed contact line is arranged in a peripheral zone of the first side of the first plate piezo element, wherein the peripheral zone comprises the first peripheral zone and the second peripheral zone.

The bone anchored hearing aid device unit may be provided in a manner, wherein the clamp system contacts at least one of the first and second first plate piezo element with a first contact line and a second contact line, the first contact line and the second contact line being curved, or wherein the clamp system contacts the at least one of the first and second plate piezo element with a closed contact line, the closed contact line being curved.

Accordingly, when the contact line extends over the width of the plate piezo element, the line of clamping not straight and follows a curve over the width of the plate piezo element. A curved contact line allows for increasing the force output of the actuator at high frequency. In particular, the curved contact line allows for a variation of the free vibrating length of the plate piezo element over its width, resulting in a smoothing of the force output curve at high frequencies of the multi-resonance peak. This effect can also be achieved by a curved outline of the plate piezo element shape itself, but such custom shapes are rather difficult to achieve in production. One example would be to cut the corners of the first plate piezo element with a straight line but have an arc shaped line of clamping for a smooth transition in free length. The curved contact line offers achieving the same effect in a simple manner and the plate piezo element itself can be cut in ways that are easier to achieve in production.

The bone anchored hearing aid device unit may be provided in a manner, wherein the clamp system has at least two clamp elements (e.g. the first and the second clamp elements) welded or glued to the housing.

Tests have shown that welding straight clamping bars at the edge of the plate piezo element to the housing generated good performance, in particular due to the minimized energy losses compared to a clamping system involving spring elements. Further, this configuration is easier to miniaturize compared with many other solutions. Also, a clamping by means of welding (or gluing) simplifies the manufacturing of the hearing aid device unit, in particular in terms of assembly. Lastly, a solution without springs is more reliable and have better longevity.

The bone anchored hearing aid device unit may be provided in a manner, wherein the clamp system and the housing, preferably a bottom housing part, are configured for connecting via a screw connection, and wherein the screw connection also effects a clamping of at least one of the first and the second plate piezo element to the housing, preferably to the bottom housing part. The screw connection can be considered a screw.

This way, both the plate piezo element and the clamp system can be tightened to the housing simply by closing the housing e.g., through screwing the upper housing part to the bottom housing part, without further clamp part, which would be miniature and thus difficult in assembly.

The bone anchored hearing aid device unit may be provided in a manner, wherein the clamp system comprises a spring element for connecting the screw connection to the at least one of the first and the second plate piezo element.

The spring element effects a clamping force on the first plate piezo element and tighten it to the clamp system with the resilient force of the spring element. On one hand, this clamping system allows for reducing the risk to break the first plate piezo element. On another hand, using spring elements allows for a clamping of the first plate piezo element in a peripheral zone, while avoiding shortening the free length (and by that increasing the resonance frequency) of the plate piezo element, as would be obtained with a fixed clamping without resilience. In other words, using spring elements allows for an enhanced freedom of movement of the piezo elements (so called “simple beam” constellation), in a contrast to a clamping between fixe elements without resilience.

Such an effect is enhanced when the spring element contacts the plate piezo element substantially as a contact point, which can be realized by a designing the spring element with a rounded contacting end directed toward the plate piezo element.

The bone anchored hearing aid device unit may be provided in a manner, wherein the housing has an first housing part and a second housing part, the first housing part and the second housing part being configured to connect via a screw connection, the first housing part being provided with a spring element and the second housing part being provided with a protrusion, wherein the spring element is a clamp part of the clamp system, and wherein the protrusion is a clamp counterpart of the clamp system.

The protrusion creates a distance between the surface of the clamped plate piezo element and the housing. In other word, this constellation allows for the plate piezo element clamped between the spring element and the protrusion to move freely, without being blocked by the housing.

The protrusion can be a bead or an elevation, the protrusion preferably is shaped and positioned in a manner as to correspond to the spring element, to achieve a clamping of the plate piezo element.

The bone anchored hearing aid device unit may be provided in a manner, wherein the clamp system has at least one screw and at least one holder element, and wherein the housing has a thread for connection with the screw of the clamp system.

This configuration allows for tightening the first plate piezo element to the clamp element and the bottom housing part separately from tightening the upper housing part to the bottom housing part.

The bone anchored hearing aid device unit may be provided in a manner, wherein the clamp system has at least two compression springs configured to be compressed between a first housing part and a second housing part.

Providing such compression springs allows for some flexibility for the bending, while being strong enough so that the first plate piezo element remains sufficiently stable.

The bone anchored hearing aid device unit may be provided in a manner, wherein the clamp system has at least two torsion springs.

Here the torsion springs can be used in clamps, which maintain the first plate piezo element in a resilient way, thus allowing for some bending, and, at the same time, offering the possibility of an easy repositioning the first plate piezo element.

More than two, e.g., three torsion springs can be provided in the clamp system.

When the bone anchored hearing aid device unit is an implant, it may be provided in a manner, wherein the housing is provided with at least one protrusion, wherein the protrusion is located on an outer surface of the housing that is aimed to be oriented substantially towards the ear canal when implanted, and wherein the protrusion is configured to transmit vibrations from the actuator to a bone on which the bone anchored hearing device unit is implanted.

This way, the vibration/sound path from the implant to the cochlear is reduced.

In particular, one or multiple bump (s) close to the ear canal create a distinct feeding point from the implant to the bone. One possibility is to shape the vertical footprint of the implant with significant vertical shapes close to the ear canal. These vertical shapes can be formed like one or multiple pins along with the implant side that is closest to the ear canal or as a bar following the shape of the edge of the implant along the side closest to the ear canal.

A bone anchored hearing aid device typically comprises an external unit and an implant unit.

When the bone anchored hearing aid device is a percutaneous bone anchored hearing aid device, the external unit typically includes i) an input unit such as a microphone for receiving an acoustic signal from a user’s surroundings and providing a corresponding input audio signal, and/or ii) a receiving unit for electronically receiving an input audio signal.

The external unit may further include a signal processing unit for processing the input audio signal. The signal processing unit may include an amplifier that is adapted to apply a frequency dependent gain to the input audio signal. The signal processing unit may further be adapted to provide other relevant functionality such as compression, noise reduction, etc.

Moreover, the external unit may comprise an output unit including an output transducer such as an actuator for providing a structure-borne acoustic signal based on the processed input audio signal. The actuator could also be attached to a soft band, headband or neck band. External units of bone anchored hearing aid devices typically use an actuator/transducer technology to vibrate sound into the skull of a patient based on variable reluctance.

The external unit may comprise an abutment configured to be connected to the implant unit, the implant unit being configured to be fixated in a skull of a user. The implant may comprise an osseo-integrated screw in the skull, in particular in the temporal bone of the user. The vibrations produced by the actuator of the external unit are transferred to the implant unit via the abutment.

When the bone anchored hearing aid device is a transcutaneous bone anchored hearing aid device, the external unit typically includes the input unit and the signal processing unit, but the output transducer/actuator is arranged within the implant unit, and the external unit does not comprise an abutment but a communication unit to provide inductively the processed input audio signal to the implant.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

Further features and advantages of the bone anchored hearing aid device emerge from the following description where reference is made to the attached drawing.

BRIEF DESCRIPTION OF THE DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION OF THE DRAWINGS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

Figure 1A:
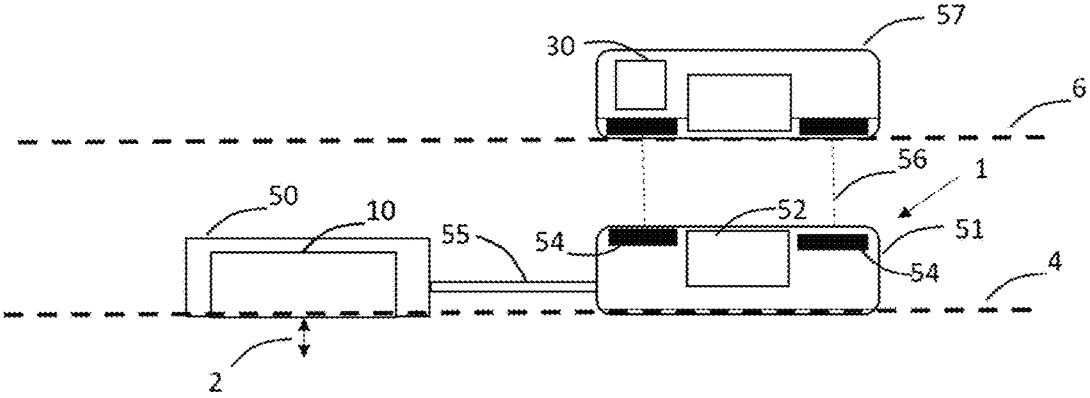
FIG. 1*a* to 1*c* show different examples of a bone anchored hearing aid device.
Figure 1B:
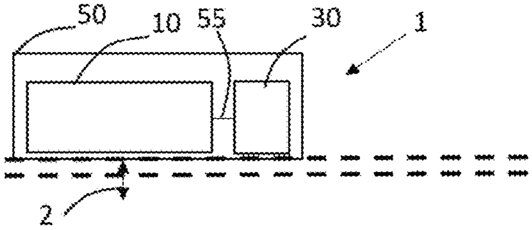
Figure 1C:
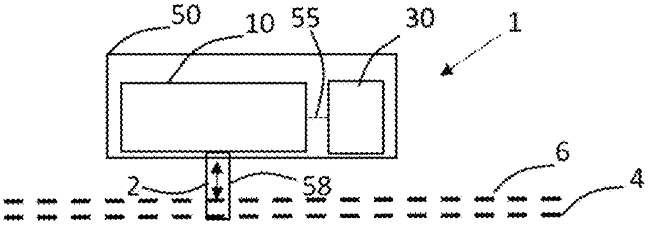

FIG. 1*a* to 1*c* illustrate different examples of a bone anchored hearing aid device 1 configured to apply a main vibration 2 onto a skull 4 of a recipient of the bone anchored hearing aid device 1. FIG. 1*a* illustrates an example where the bone anchored hearing aid device 1 is a transcutaneous bone anchored hearing aid device 1 including an external unit 57 configured to be arranged above the skin 6, and an implant unit, configured to be arranged under the skin 6. The implant unit includes a first housing 50 and a second housing 51 which are connected by at least one or more wires 55. In another example the connection may be wireless, or the implant unit comprises only one housing. The first housing 50 includes an actuator 10, and the second housing 51 includes a coil 54 configured to communicate 56 inductively and through the skin 6 and to the external unit 57. The second housing 51 includes a magnet apparatus 52 configured to attract the external unit 57. In this example, a processing unit 30 is arranged within the external unit 57. The processing unit is configured to control the actuator 10 and the communication 56 which includes power to activate the actuator 10. The communication 56 may include information and/or power. The communication 56 may be bidirectional including information and/or power. In FIG. 1*b*, which shows an example of a percutaneous bone anchored hearing aid device, the actuator 10 and the processing unit 30 are arranged within the first housing 50 and are connected via one or more wires 55. In this example, the hearing aid 1 is arranged on the skin 6, and the vibration 2 is transferred to the skull 4 via the first housing 50. In FIG. 1*c*, which shows another example of a percutaneous bone anchored hearing aid device, the first housing 50 is connected to the skull 4 via an implant screw 58, and in this example the vibration 2 is transferred to the skull via the implant screw 58.

Figure 2:
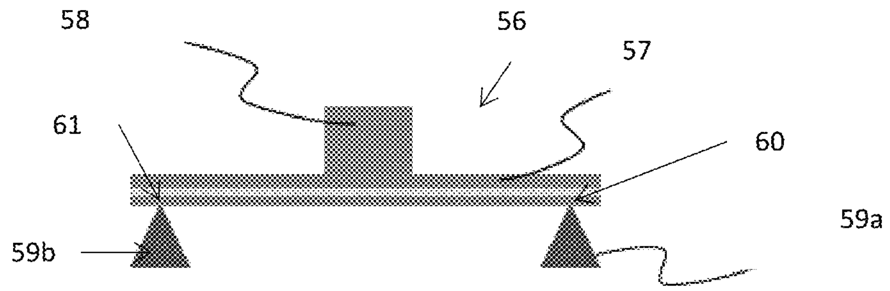
FIG. 2 is a schematic representation of an actuator of a bone anchored hearing aid device according to an exemplary embodiment of the disclosure.

FIG. 2 shows an actuator 56 of a bone anchored hearing aid device according to an exemplary embodiment of the disclosure, which correspond for example the actuator 10 of FIG. 1*a*, 1*b* or 1*c*. The actuator 56 has a plate piezo element 57 and a counterweight 58. Also shown is a clamp system 59*a*, 59*b*, wherein the clamp system 59*a*, 59*b* is configured for attaching the actuator 56 or part of the actuator to the housing of the unit, e.g. the first housing 50 of the implant unit of FIG. 1*a*, or the first housing 50 of the external unit of FIG. 1*b* or 1*c*. The clamp system 59*a*, 59*b* clamps the plate piezo element 57 of the actuator at a first clamp position 60 and at a second clamp position 61. Further, the counterweight 58 is arranged on one side of the plate piezo element 57 and is substantially centered with respect to the first clamp position 60 and the second clamp position 61. The one side may be understood as a respective "top" side of the plate piezo element 57. Alternatively, the counterweight 58 can be arranged on another side of the plate piezo element 57. For example, the counterweight 58 could be located on the same side as the clamp system 59*a*, 59*b*. The another side (e.g., different side) can be understood as a respective "bottom" side of the plate piezo element 57. The counterweight can be substantially centered with respect to the first clamp position 60 and the second clamp position 61.

Figure 2A:
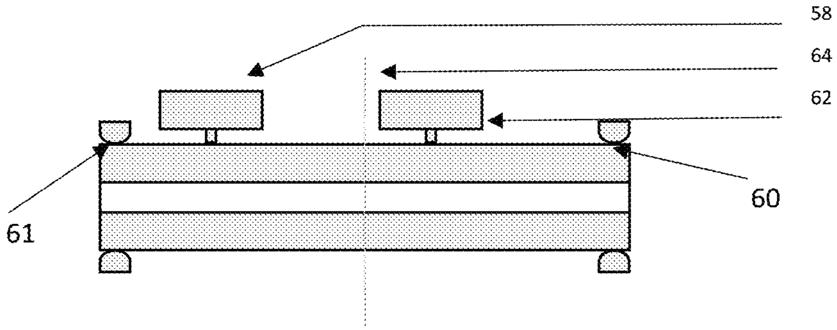
FIG. 2*a* is a schematic representation of an actuator of a bone anchored hearing aid device according to an exemplary embodiment of the disclosure with two counterweights.

FIG. 2*a* shows an actuator with a first counterweight 58 and with a second counterweight 62. The first counterweight 58 is arranged at a shorter distance to the second clamp position 61 in comparison to the distance between the first counterweight 58 and the geometrical center 64 of the side of the plate piezo element. The second counterweight 62 is arranged at a greater distance from the he geometrical center 64 of the side of the plate piezo element in comparison to the distance between the second counterweight 62 and the first clamp position 60.

The use of the first counterweight 58 and the second counterweight 62 can be used in all of the discussed designs, such as by turning a single counterweight into two counterweights (e.g., the first counterweight and the second counterweight). For example, counterweight 1300 can be replaced with a first counterweight 58 and a second counterweight 62.

Figure 3:
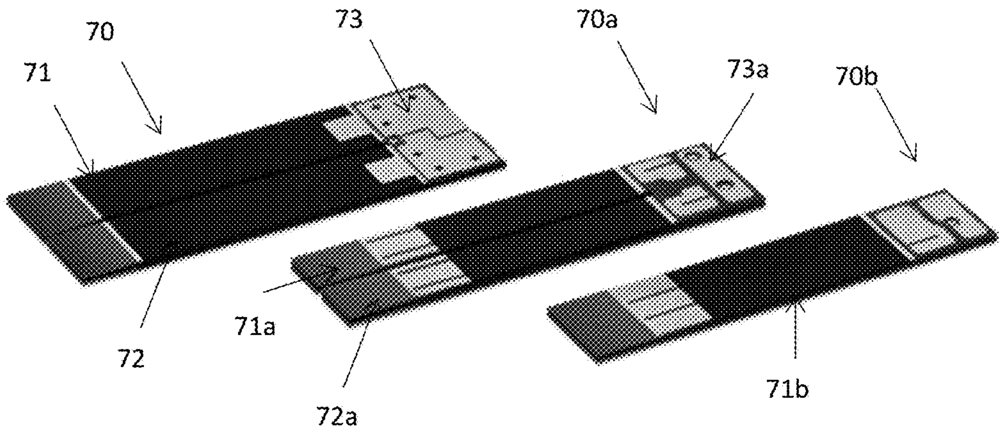
FIG. 3 shows several constellations of combined piezo plate elements or single plate piezo element of a bone anchored hearing aid device according to an exemplary embodiment of the disclosure.

FIG. 3 shows three piezo plate elements 70, 70*a* and 70*b* for an actuator of a bone anchored hearing aid device according to an exemplary embodiment of the disclosure. Element 70 has a first plate piezo element 71 and a second plate piezo element 72, the first plate piezo element 71 and the second plate piezo element 72 being provided with a joint base and in parallel 73. The first plate piezo element 71 and the second plate piezo element 72 have substantially similar lengths and each of the first plate piezo element 71 and the second plate piezo element 72 are respectively provided with different total weights of counterweight (not shown). Accordingly, the piezo plate element 70 has multiple resonance frequencies achieved by the different weight on each "arm" 71, 72 of the plate piezo element.

Element 70*a* also has a first plate piezo element 71*a* and a second plate piezo element 72*a*, the first plate piezo element 71*a* and the second plate piezo element 72*a* being provided with a joint base 73*a* and in parallel. The first plate piezo element 71*a* and the second plate piezo element 72*a* have different piezo-electromechanical properties and are respectively provided with similar total weights of counterweight (not shown).

Element 70*b* has a single piezo plate element 71*b*. The bases 73 and 73*a* are metallic contraction points.

Figure 4:
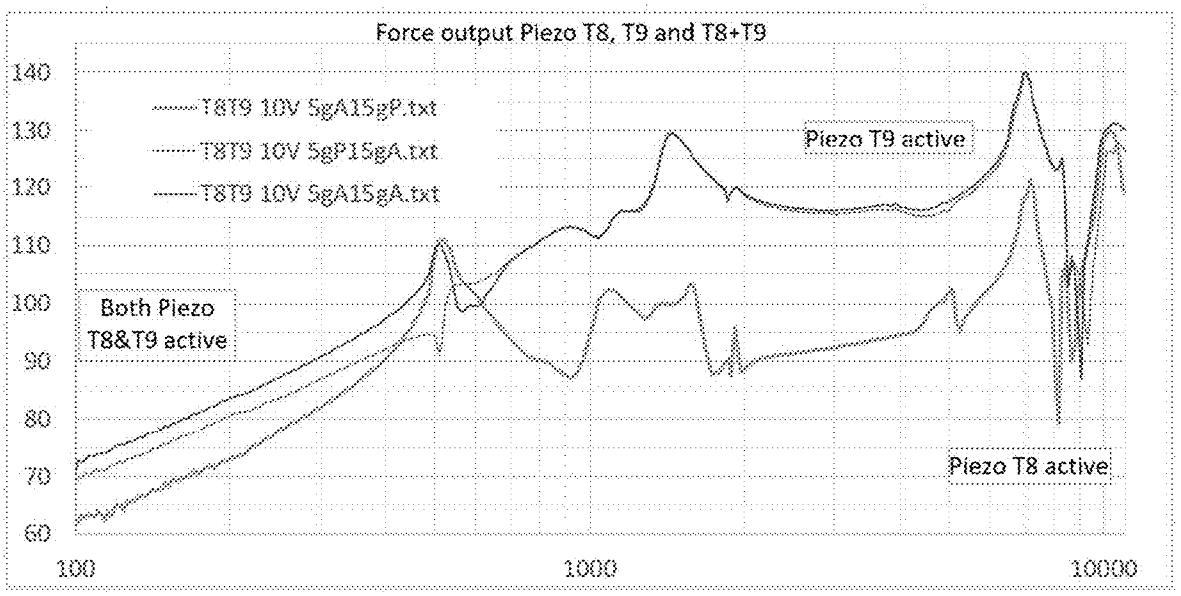
FIG. 4 shows a diagram of a force output of several piezo plate elements of a bone anchored hearing aid device according to an exemplary embodiment of the disclosure.

FIG. 4 shows a diagram of a force output of a high power piezo plate element (T9) with a resonance frequency about 1200 Hz (logarithmic frequency scale), a force output of a piezo plate element (T8) with different size and material and a resonance frequency around 500 Hz, and a force output of a high power plate piezo element (T9) combined with a plate piezo element (T8). Y is depending on input voltage and material and is usually between 50 and 100 dB.

Material and length of the piezo plate elements T8 and T9 together with the mass of the chosen counterweights define the resonance peak, while the respective widths of the piezo plate elements T8 and T9 define the force output contribution to the total. While the number of plate piezo elements or "arms", as shown in FIG. 3 for elements 70 and 70*a*, define the number of resonance peaks, the material, the shape and the mass of the respective counterweights can be combined together in any desired configuration.

Figure 5:
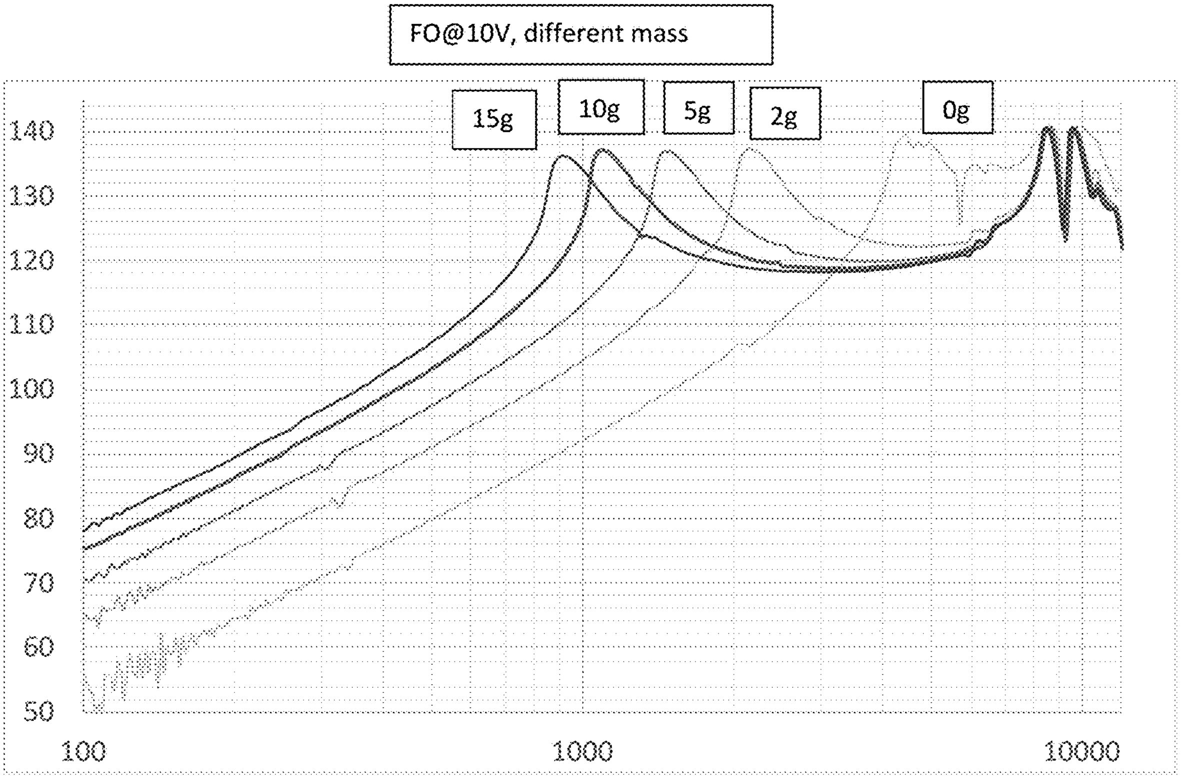
FIG. 5 shows a diagram of resonance frequency and force output of different plate piezo elements of a bone anchored hearing aid device according to an exemplary embodiment of the disclosure.

FIG. 5 shows a diagram of resonance frequency and force output of different plate piezo elements, wherein Y is depending on input voltage and material and is usually between 50 and 100 dB. Using the parameters material, length width and mass of counterweight, any force output configuration can be achieved. For example, a piezo can be provided with a length in the range of 20 to 25 mm with as little as 2 g added to create a resonance frequency of about 900 Hz. The same results can be achieved with the same material with a length of about 15 mm and a weight of about 15 g. Providing the plate piezo element with a width up to the same measurement as the length, that is provided as a squared piezo element, can increase the force output significantly. The plate piezo element used for the measurements represented in FIG. 5 is provided with a length of about 16 mm, a width of about 16 mm and a thickness of about 0.7 mm.

Figure 6A:
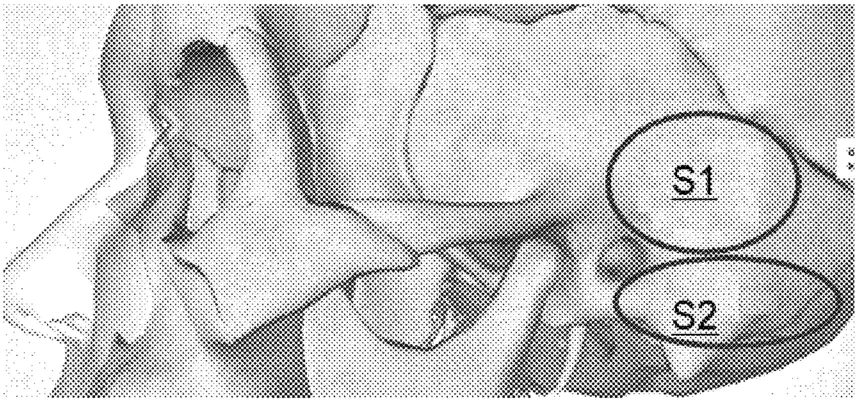
FIG. 6*a* to 6*k* show different implant/plate piezo element shapes in relation to placement of an implant/plate piezo element of a bone anchored hearing aid device according to an exemplary embodiment of the disclosure.
Figure 6B:
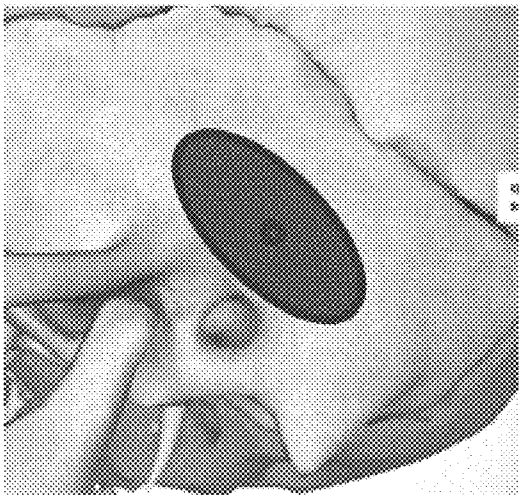

FIG. 6*a* shows a human skull, wherein a first surface area S1 of the skull behind the position of the ear is relatively flat, and a second surface area S2 of the skull behind the position of the ear is relatively curved. It is to be noted that the skull bone surface may be modified by means of drilling or scraping to obtain a flat surface or to level a skull area.

FIG. 6*b* to 6*g* show ideal positions and shapes for a bone anchored hearing aid device unit, wherein the first surface area of the skull is most convenient. Accordingly, the shape of the first piezo element and/or of the housing of the bone anchored hearing aid device unit is chosen in dependence of a dynamic force output over frequency and/or in dependence of the position of the actuator behind the ear when implanted.

FIG. 6*h* to 6*k* show positions and shapes for a bone anchored hearing aid device unit that are less convenient, in particular due to the curvature of the skull at these positions and too large shaping/sizing of the bone anchored hearing aid device unit, that overlaps at least in part with a curved zone of the skull.

Figure 6C:
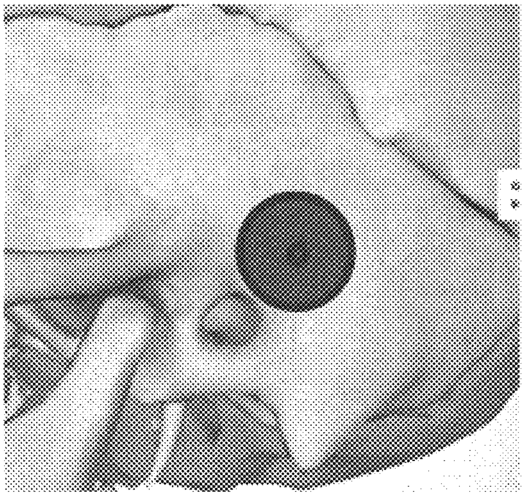
Figure 6D:
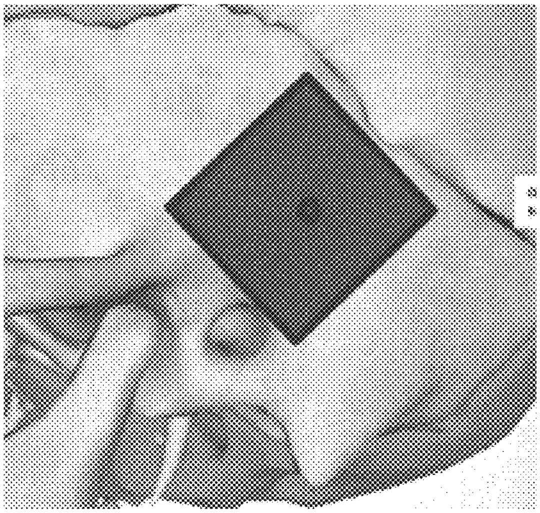
Figure 6E:
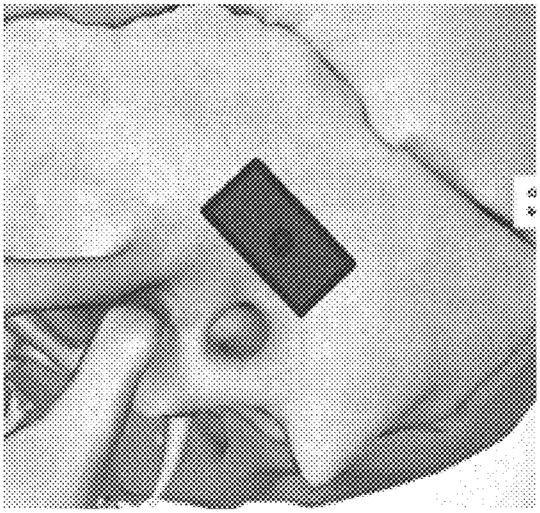
Figure 6F:
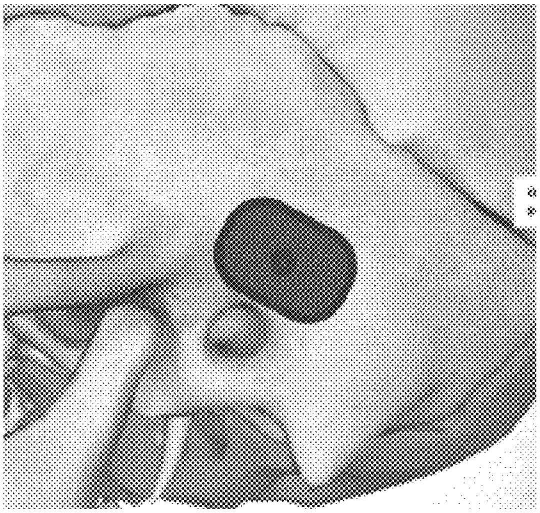

The small dot in the zone representing to implant in FIGS. 6*b* to 6*f* and 6*k* mark the geometrical center of the footprint-surface of the implant on the skull to demonstrate path length to the cochlear from the implant. In FIG. 6*c*, the housing of the bone anchored hearing aid device unit has a shape with an outline that is ellipsoid, in FIG. 6*c* the housing has a circular outline, in FIG. 6*d* the housing has a squared outline, in FIG. 6*e* the housing has a rectangular, in FIGS. 6*f* and 6*g* the housing is substantially rectangular with rounded corners.

In order to ensure a good transmission of the vibrations between implant and the skull/the ear canal, it is desired a distinct feeding point from the implant to the bone and to position the feeding point of the implant next to the ear canal. A solution is to provide one or several protrusions of the housing of the implant, which contact the housing/actuator with the skull close to the ear canal. One option is to shape the vertical footprint of the implant with significant vertical shapes close to the ear canal. These vertical shapes can be formed like one or multiple pins along with the implant side that is closest to the ear canal or as a bar following the shape of the edge of the implant along the side closest to the ear canal.

Figure 6G:
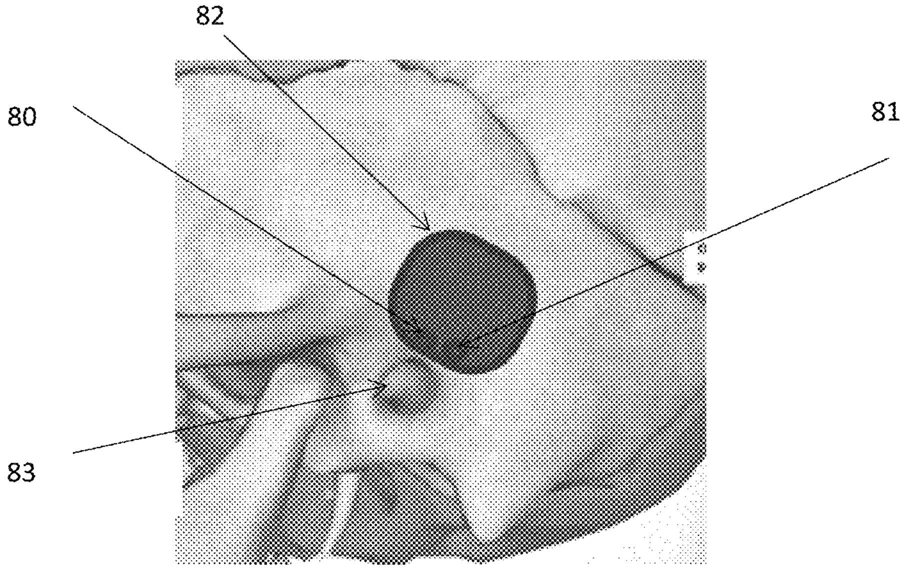
Figure 6H:
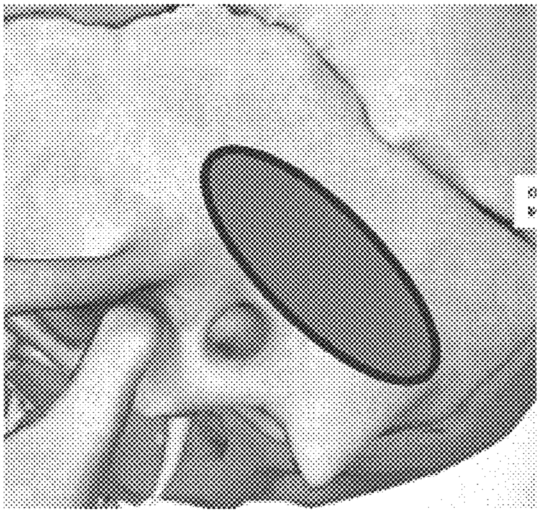
Figure 6I:
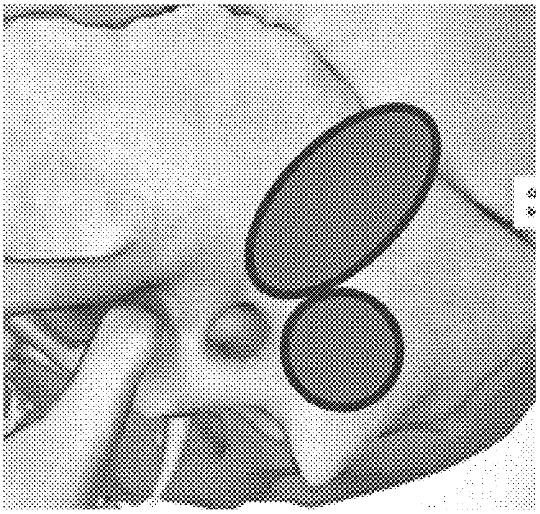
Figure 6J:
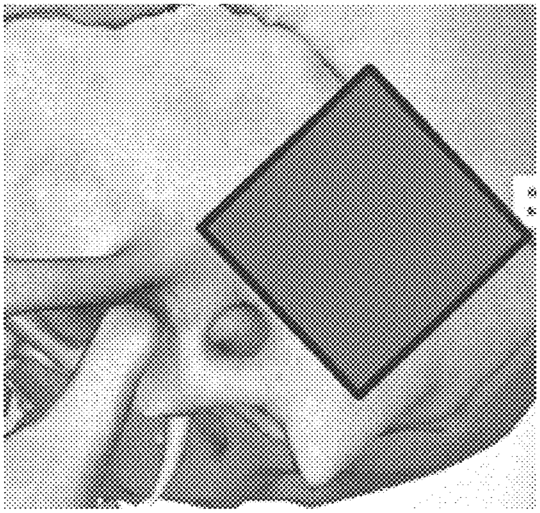
Figure 6K:
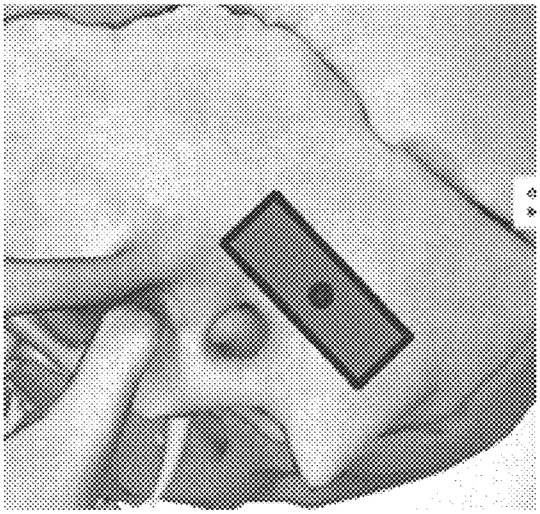

In FIG. 6*g*, two feeding points 80, 81 are represented, positioned in the implant 82 near the ear canal 83*s*.

FIG. 7*a* to 7*d* show several shapes for the housing of the bone anchored hearing aid device unit, in particular of feeding points of the bone anchored hearing aid device unit.

The feeding points or protrusions from the casing are intended to "concentrate" the vibrational transfer to the bone. Typically the device will be enclosed in a fibrous capsule that might attenuate the vibrational transfer. By having protrusions that enters the bone (drilled holes) those protrusions may integrate with the bone by means of osseointegration.

Figure 7A:
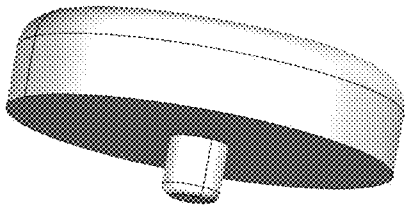
FIG. 7*a* to 7*e* show several shapes for the housing of a bone anchored hearing aid device unit according to an exemplary embodiment of the disclosure, in particular of feeding points of the bone anchored hearing aid device unit.

In FIG. 7*a*, a single feeding point formed as a pin directed towards the bone when implanted on the skull is represented. The feeding point is formed at the bottom of the housing of the bone anchored hearing aid device unit containing at least one piezo plate element.

Figure 7B:
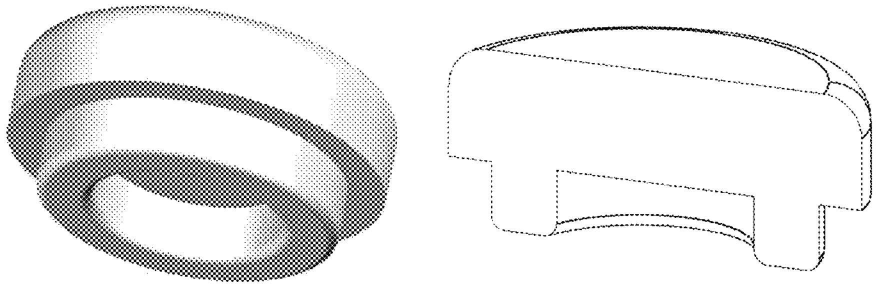
Figure 7C:
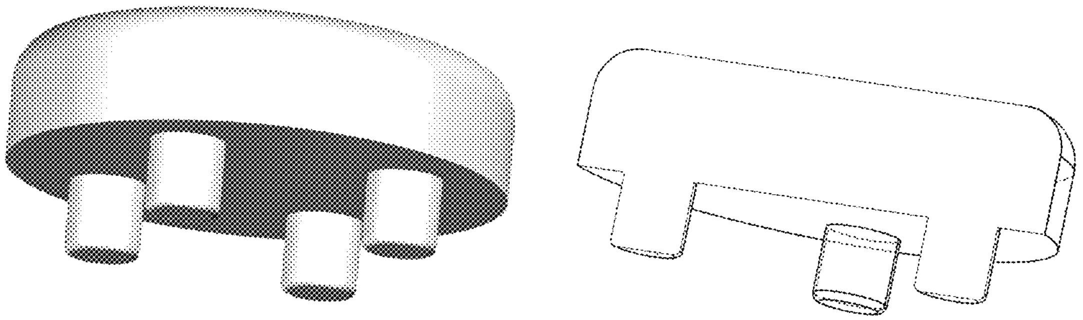
Figure 7D:
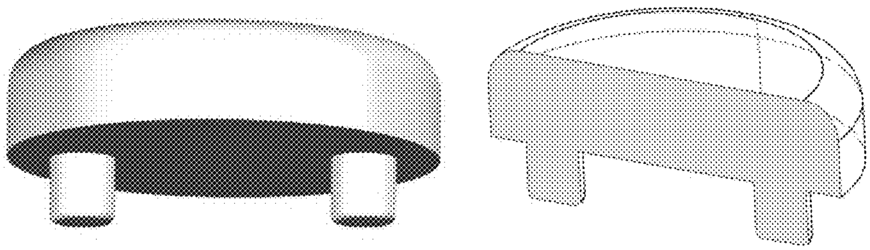

In FIG. 7*b*, the feeding point is formed as a circular protrusion of the housing of the bone anchored hearing aid device unit. In FIGS. 7*c* and 7*d*, the housing is provided with several pins directed to the bone, each being a separate feeding point. In FIG. 7*c*, there are 4 pins, dispatched over the bottom surface of the housing facing the skull, when implanted.

Figure 7E:
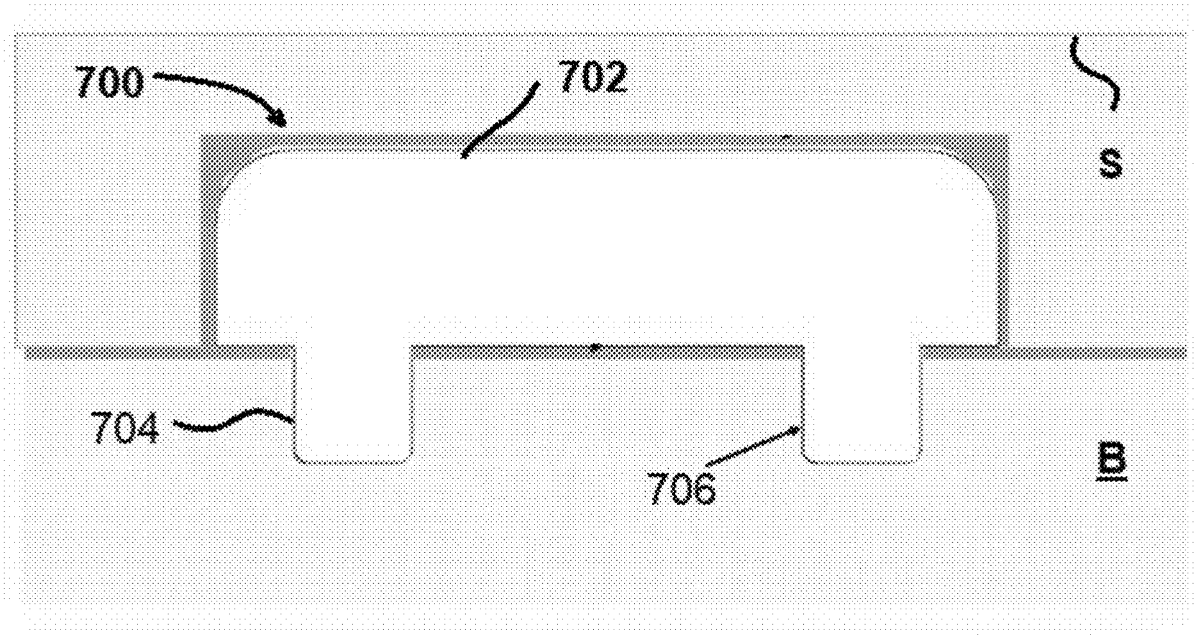

FIG. 7*e* shows a bone anchored hearing aid device unit 700 having a housing 702 with two pins 704, 706, each being a feeding point, wherein the bone anchored hearing aid device unit 700 is implanted on the bone B and subcutaneously, i.e. under the skin S. The feeding points 704, 706 are fixed into the bone B for a contact with the bone B without intermediate soft tissue and thus a better vibration transmission.

Figure 8:
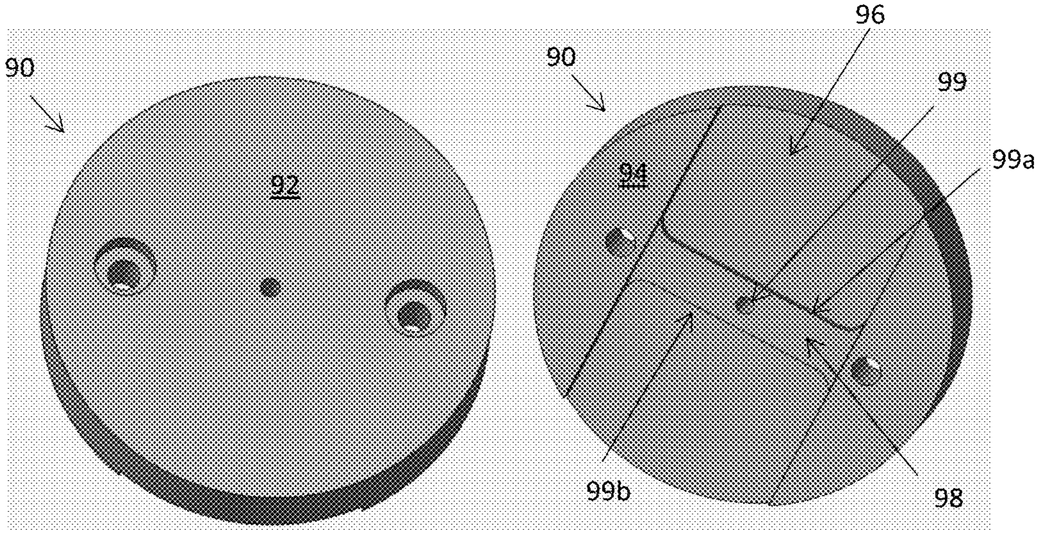
FIG. 8 shows a general design of a counterweight of a bone anchored hearing aid device according to an exemplary embodiment of the disclosure.

FIG. 8 shows a general design of a counterweight 90 for a bone anchored hearing aid device unit according to an exemplary embodiment of the disclosure. The counterweight 90 is substantially flat with a top side 92 (left part of FIG. 8) and a bottom side 94 (right part of FIG. 8) with a circular outline. The bottom side of the counterweight has a recess 96, a middle bridge 98 crossing the recess 96 and a centered through hole 99. The through hole 98 is provided for receiving glue for a connection with a piezo plate element. The middle bridge 98 is provided with side recesses 99*a* and 99*b* for retaining the glue to dispatch in the recess 96.

The mass of the counterweight can be varied by adapting the height or thickness of the counterweight. The counterweight adapted for a bone anchored hearing aid device unit can have, e.g. a mass of 10 g, 15 g, 20 g or 25 g. The counterweight can be a first counterweight and a second counterweight instead of a single counterweight.

Figure 9:
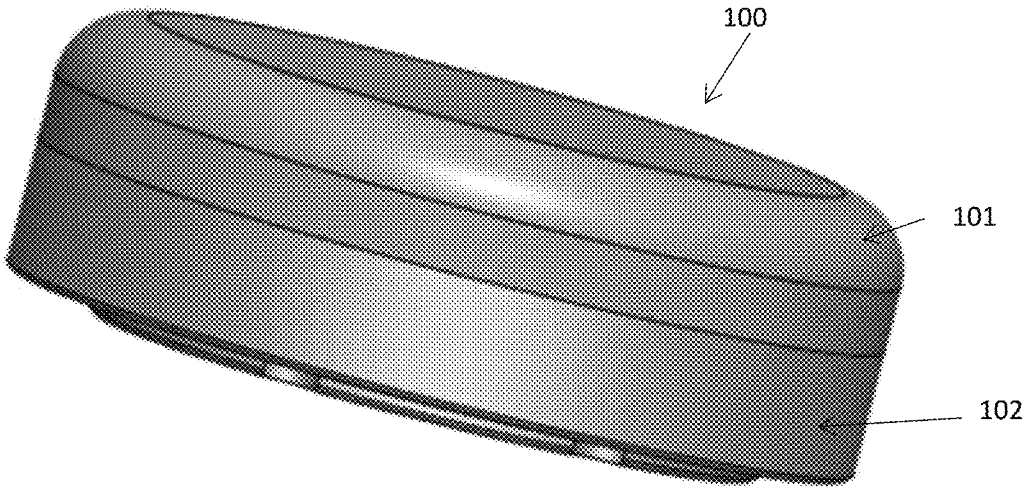
FIG. 9 shows a housing of a bone anchored hearing aid device unit according to an exemplary embodiment of the disclosure.

FIG. 9 shows a housing 100 of a bone anchored hearing aid device unit according to an exemplary embodiment of the disclosure, provided with a first housing part 101 and a second housing part 102, the first housing part and the second housing part being configured to connect via a screw connection.

FIG. 10 to 17*c* show bone anchored hearing aid device units 1000 according to an exemplary embodiment of the disclosure, each with a housing having a first housing part

101 and a second housing part 102, with a counterweight 1300 and with a piezo plate element 1100 and with a clamp system 1200, wherein the counterweight 1300 is glued to the piezo plate element 1100. The counterweight 1300 can be the first counterweight. The counterweight 1300 can be two counterweights (e.g., a first counterweight and a second counterweight). The first counterweight and the second counterweight can be provided on said one side of the first plate piezo element. The first counterweight and the second counterweight can be provided on different sides of the first plate piezo element.

The bone anchored hearing aid device units 1000 shown in FIGS. 10 to 13 and 16 respectively have a clamp system 1200 having a clamp part contacting the piezo element on a first side 1101, wherein the clamp system 1200 has a clamp counterpart contacting the plate piezo element 1100 on a second side 1102 opposite to the first side 1101, wherein the clamp part contacts the first side 1101 with a closed contact line, and wherein the closed contact line connects the first clamp position and the second clamp position. In other words, the closed contact line connects endpoints of the closed contact line, which can be located similar to the first clamp position can the second clamp position disclosed herein.

In FIG. 14, 15, 17 to 19, the clamp system comprises at least two separate clamp elements, each clamping a piezo plate element with a clamp part and a clamp counterpart.

Figure 10:
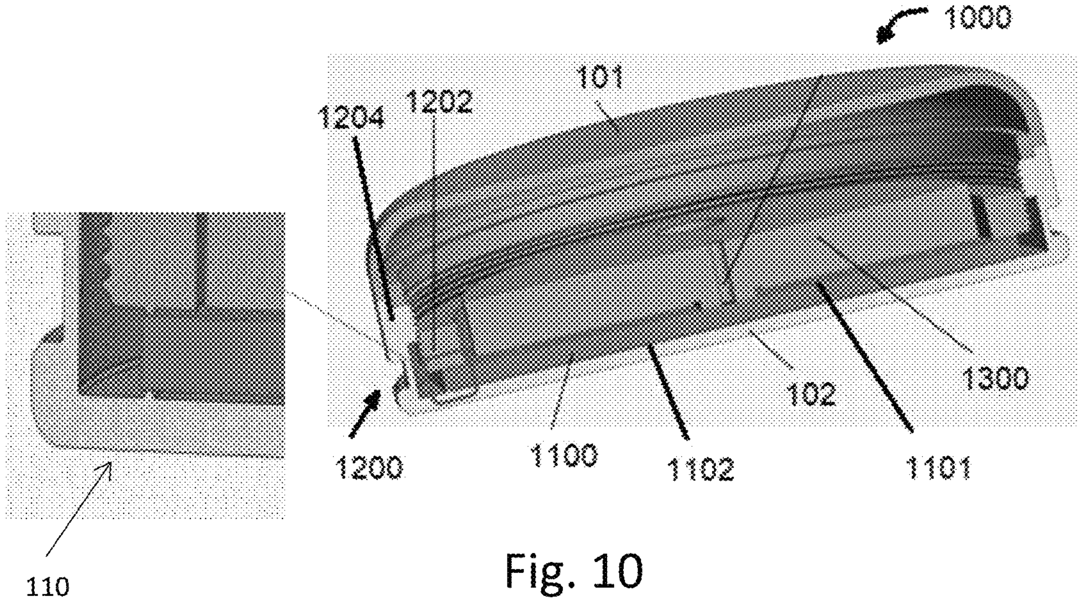
FIG. 10 shows a first design of a bone anchored hearing aid device unit according to an exemplary embodiment of the disclosure.
Figure 11:
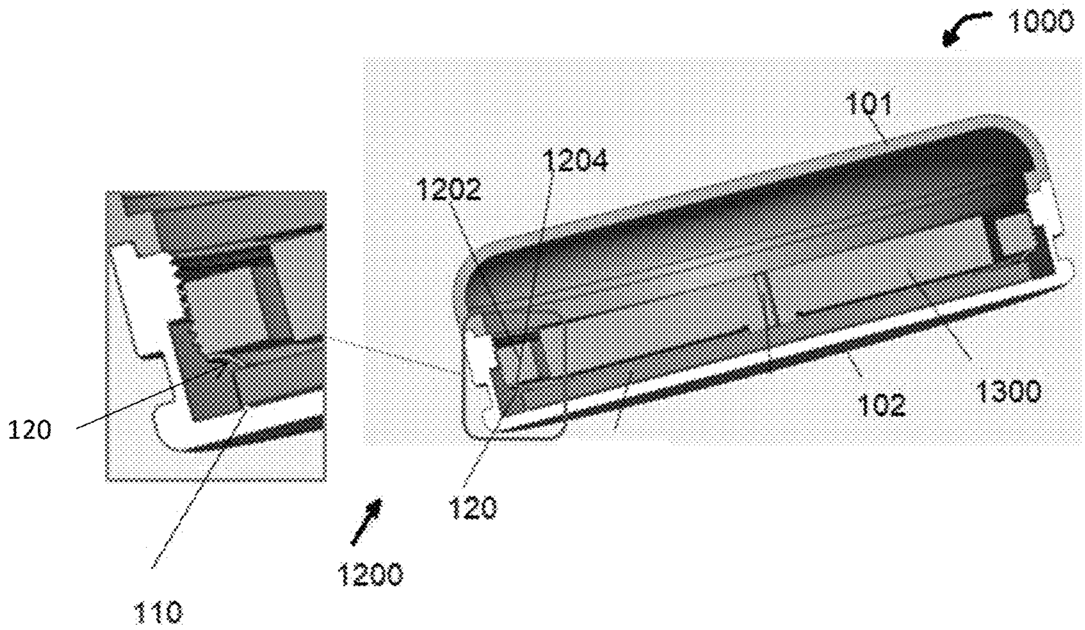
FIG. 11 shows a second design of a bone anchored hearing aid device unit according to an exemplary embodiment of the disclosure.
Figure 12:
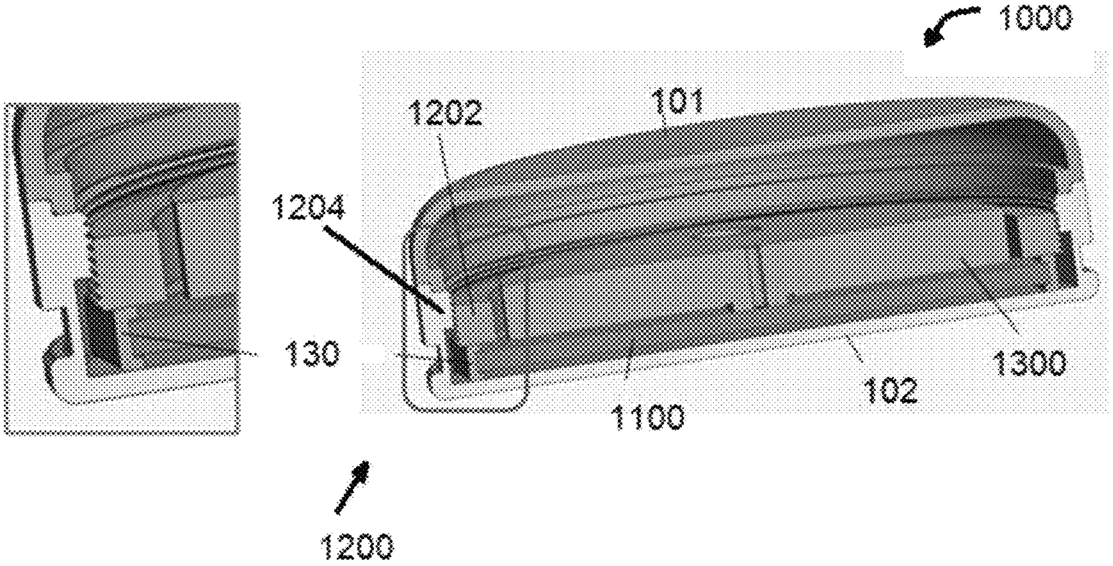
FIG. 12 shows a third design of a bone anchored hearing aid device unit according to an exemplary embodiment of the disclosure.

FIG. 10 to 12 show bone anchored hearing aid device units, wherein an intermediate screw element 1202 is provided for clamping the piezo plate element 1100 to the second, bottom housing part 102. The second, bottom housing part 102 has a thread 1204 for connection with the intermediate screw element 1202 of the clamp system 1200.

In FIG. 10, the second housing part is provided with a protrusion 110 acting as a clamp counterpart to the intermediate screw element 1202, being a clamp part of the clamp system 1200.

In FIG. 11, the intermediate screw element 1202 is provided with a spring element 120 as a clamp part of the clamp system 1200 and a protrusion 110 of the bottom housing part 102 with a corresponding shape and position acts as a clamp counterpart to the spring element 120. When the intermediate screw element 1202 is tightened, the spring element 120 induces a clamping force on the piezo plate element 1100.

In FIG. 12, the clamp system 1200 comprises an intermediate screw element and a holder element 130.

FIG. 13 to 15*b* show bone anchored hearing aid device units 1000 according to an exemplary embodiment of the disclosure, wherein the connection of the first housing part 101 with the second housing part 102 effects a clamping of a piezo plate element 1100.

Figure 13:
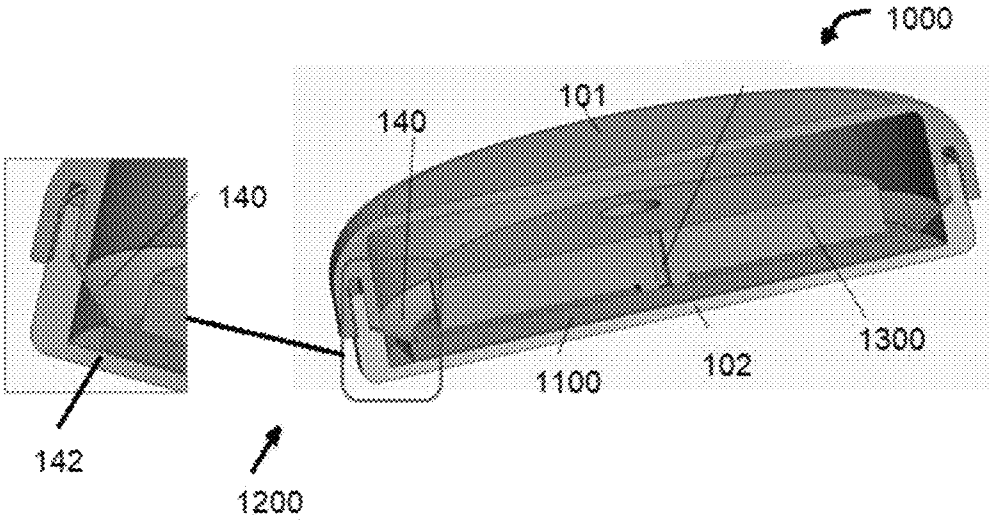
FIG. 13 shows a fourth design of a bone anchored hearing aid device unit according to an exemplary embodiment of the disclosure.

In FIG. 13, the top housing part 101 is with a spring element 140 and the second housing part 102 is provided with a protrusion 142. The spring element 140 acts as a clamp part of the clamp system 1200 and the protrusion 142 acts as a clamp counterpart to the spring element 140.

Figure 14:
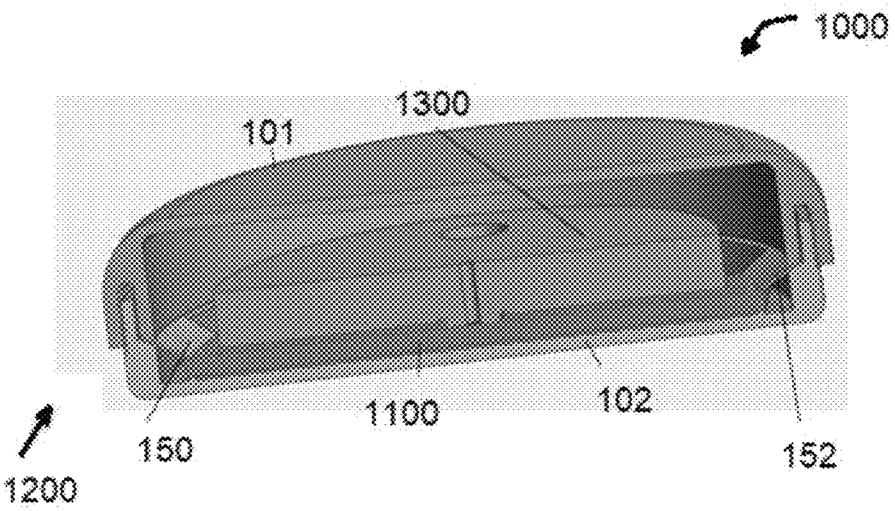
FIG. 14 shows a fifth design of a bone anchored hearing aid device unit according to an exemplary embodiment of the disclosure.

FIG. 14 shows a bone anchored hearing aid device unit 1000 similar to the one of FIG. 13, wherein the spring element is split in a plurality of spring elements 150, 152 arranged at the circumference of the inner side of the top housing part.

Figure 15A:
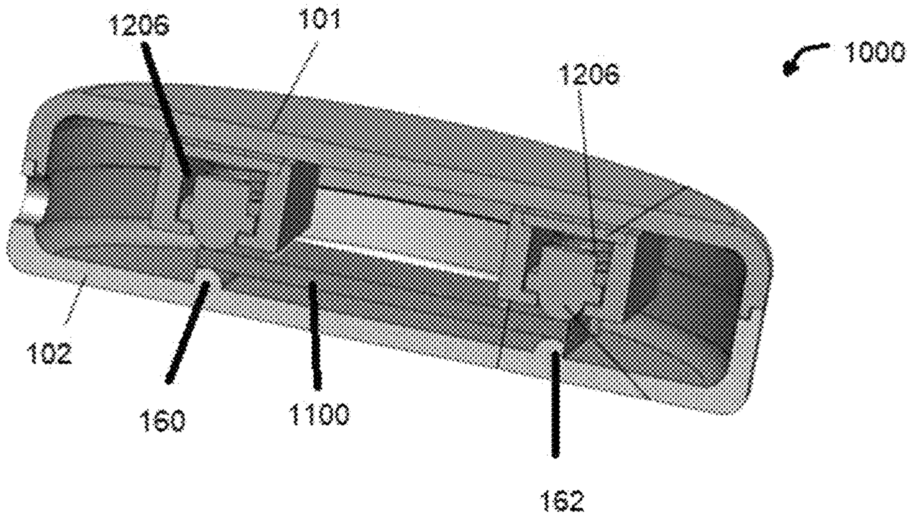
FIG. 15*a* to 15*c* shows a sixth design of a bone anchored hearing aid device unit according to an exemplary embodiment of the disclosure.

FIG. 15*a*-5*c* shows a bone anchored hearing aid device unit 1000, wherein the clamp system 1200 has at two compression spring elements 1206 configured to be compressed between the first housing part 101 and the second housing part 102. The bottom housing part 102 has two protrusions 160, 162 shaped for acting as clamp counterparts to the compression spring elements 1206. The bone anchored hearing aid device unit 1000 has an overall height of about 8 mm and an overall diameter of about 32 mm.

Figure 15B:
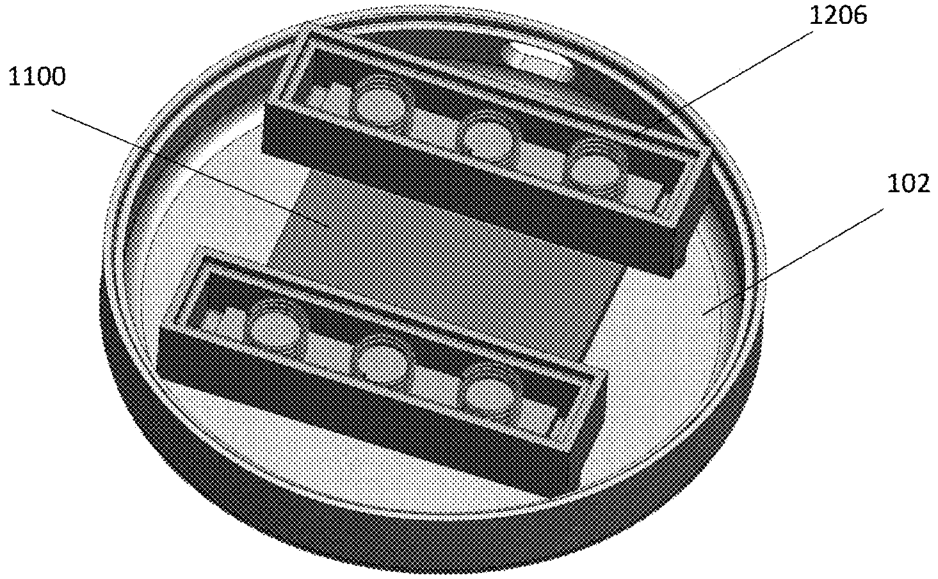

FIG. 15*b* shows the bottom housing part 102, the plate piezo element 1100 and the bottom parts of two compression spring elements 1206, respectively, from an upper perspective. The two compression spring elements 1206 have three springs arranged in a row, respectively.

Figure 15C:
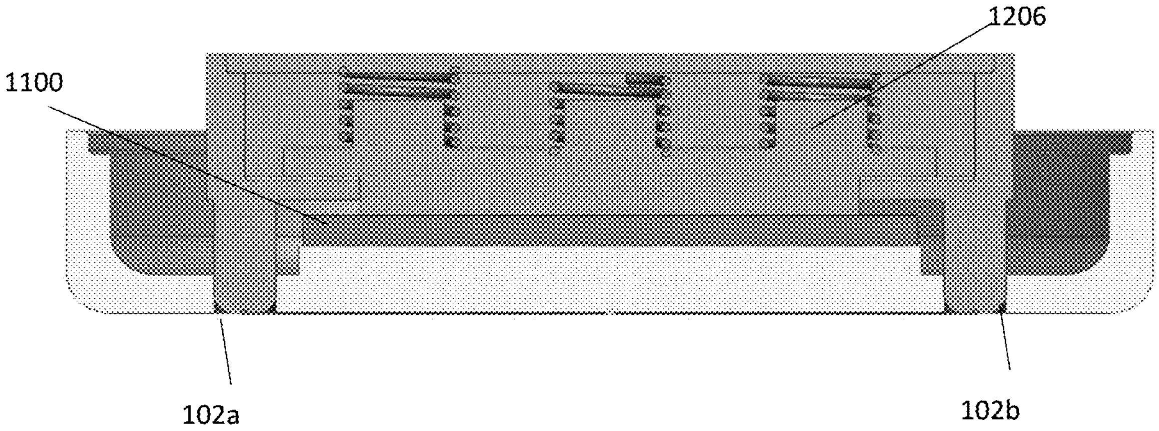

FIG. 15*c* shows that the bottom housing part 102 has positioning holes 102*a* and 102*b* for maintaining the two compression spring elements 1206 in place when they are compressed between the first housing part 101 and the second housing part 102. AS an effect, the two compression spring elements 1206 are pushed on to the plate piezo element 1100 and, at the same time, are maintained in position with regard to the bottom housing part 102 via an interference fit of the two compression spring elements 1206 and the positioning holes.

Figure 16:
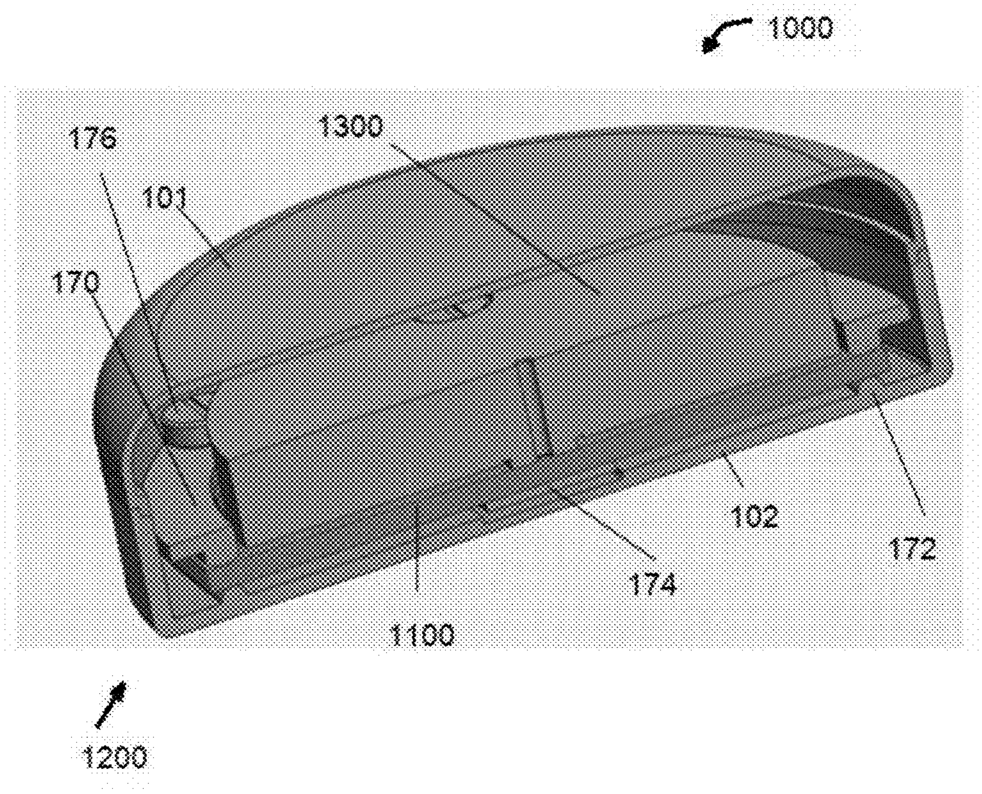
FIG. 16 shows a seventh design of a bone anchored hearing aid device unit according to an exemplary embodiment of the disclosure.

FIG. 16 shows a bone anchored hearing aid device unit 1000, wherein the clamp system 1200 has a holder element 170 attached to the bottom housing part 102 by screw connection, in particular with a screw 176 and a thread in the bottom housing part 102. Thus, the piezo plate element 1100 lies in a protrusion 172 of the bottom housing case 102 acting as a clamp counterpart to the holder element 170. Also, a mass holder element 174 is provided between the piezo plate element 1100 and the bottom housing part 102.

Figure 17A:
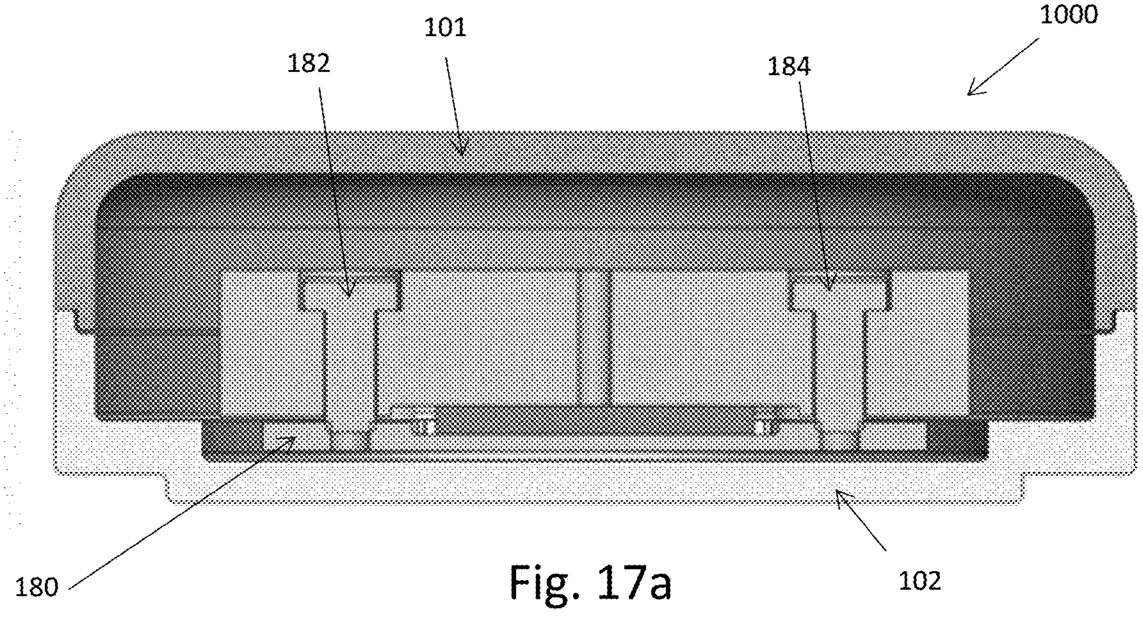
FIG. 17*a* to 17*c* show an eight design of a bone anchored hearing aid device unit according to an exemplary embodiment of the disclosure.
Figure 17B:
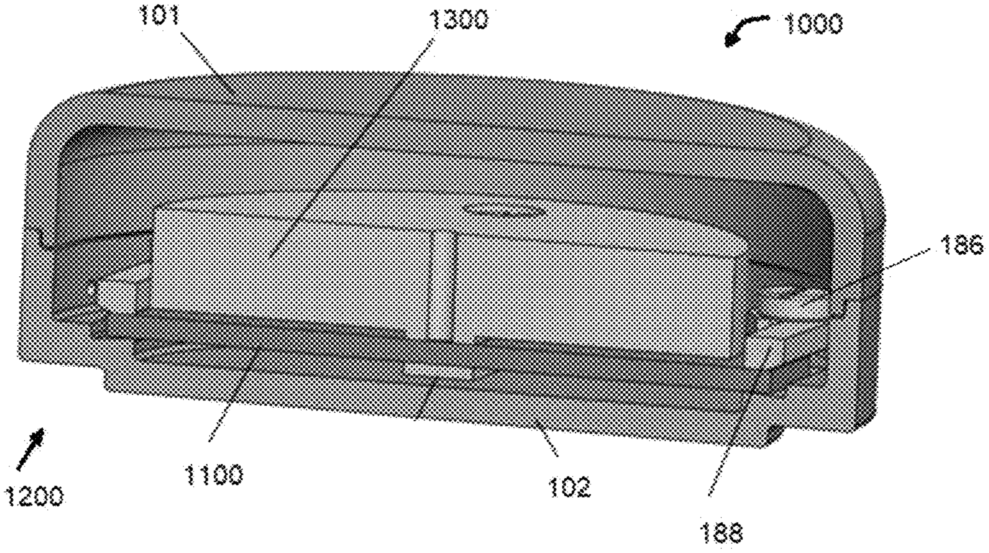
Figure 17C:
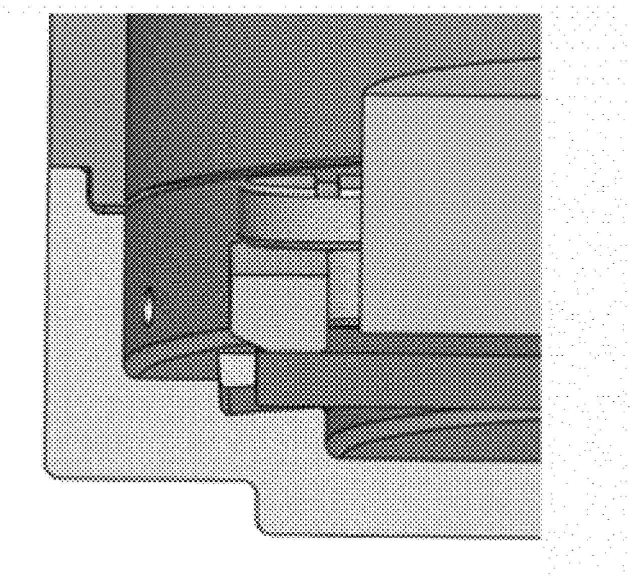

FIGS. 17*a* and 17*b* show a bone anchored hearing aid device unit 1000 in two cross section views, wherein the cross section of FIG. 17*a* is perpendicular to cross section of FIG. 17*b*. The bone anchored hearing aid device unit 1000 is provided with a holder element 188 attached to the bottom housing part 102 via screw connection 186, shown in detailed view in FIG. 17*c*. Further, the counterweight 1300 is attached to a bottom mass holder 180 via screw connection 182, 184.

Figure 18A:
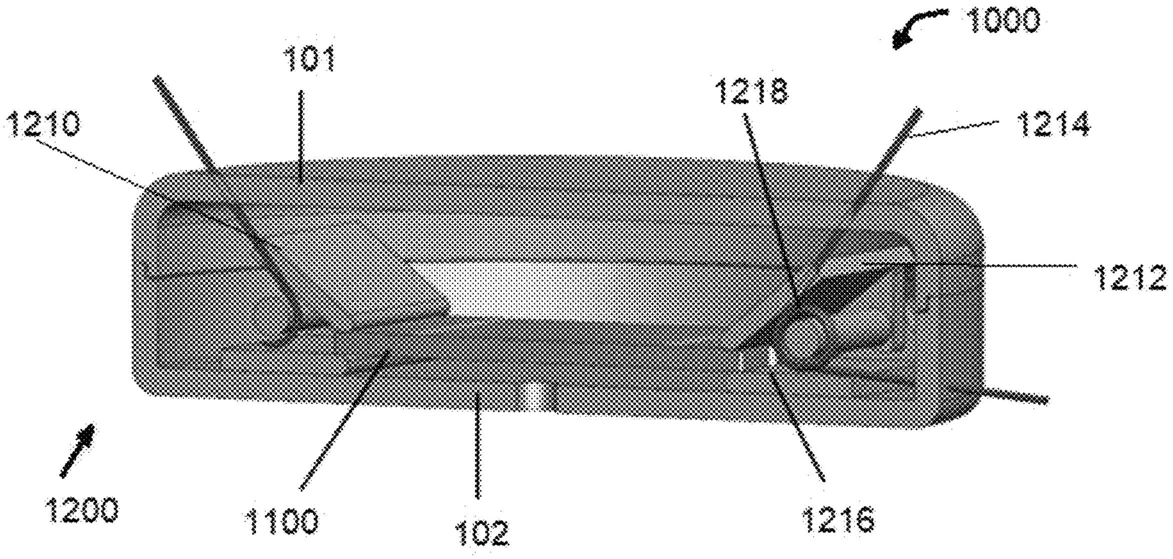
FIGS. 18*a* and 18*b* show a ninth design of a bone anchored hearing aid device unit.
Figure 18B:
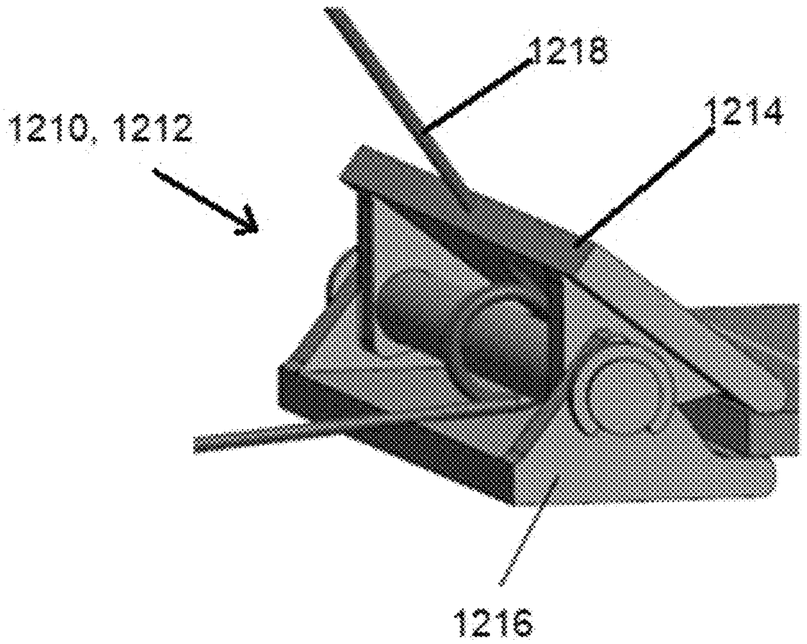

FIGS. 18*a* and 18*b* show a bone anchored hearing aid device unit 1000, wherein the clamp system 1200 has two clamp elements 1210, 1212, each clamp element 1210, 1212 having a clamp part 1214, a clamp counterpart 1216 and a torsion spring 1218. The respective clamp counterparts 1216 are glued to the bottom housing part 102.

Figure 19A:
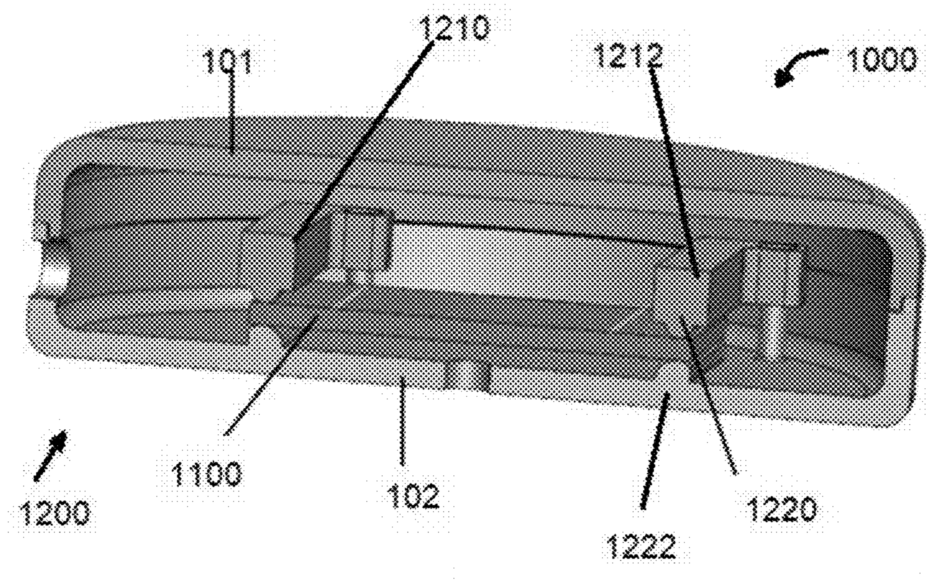
FIG. 19*a* to 19*e* show a tenth design of a bone anchored hearing aid device unit according to an exemplary embodiment of the disclosure.
Figure 19B:
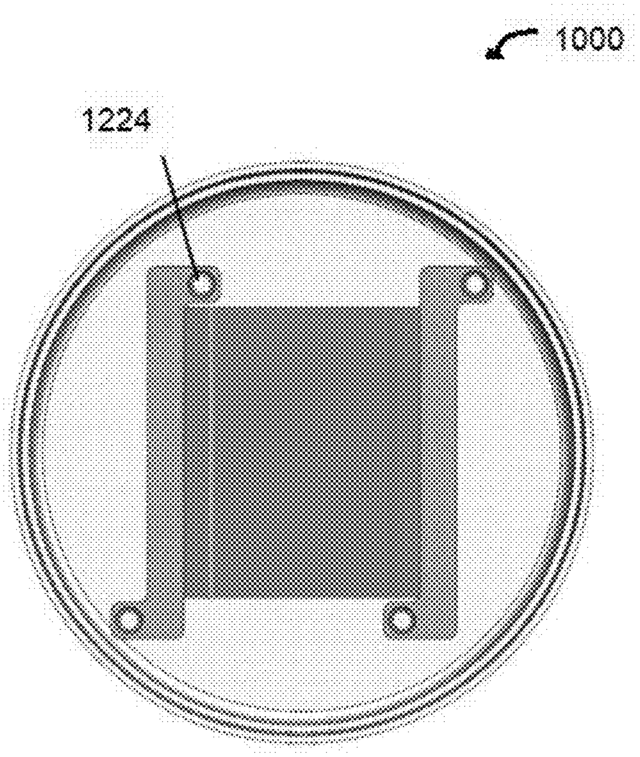
Figure 19C:
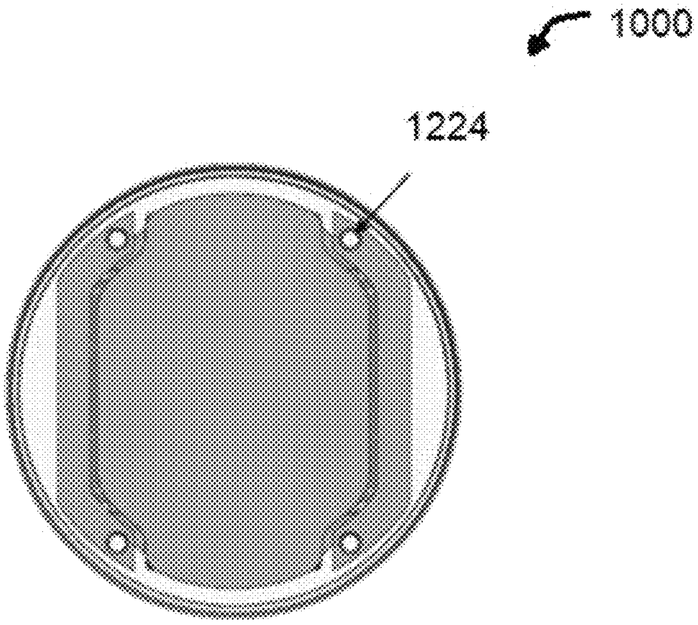
Figure 19D:
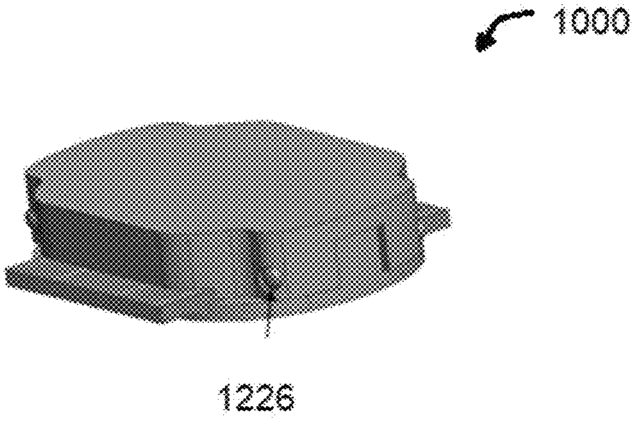
Figure 19E:
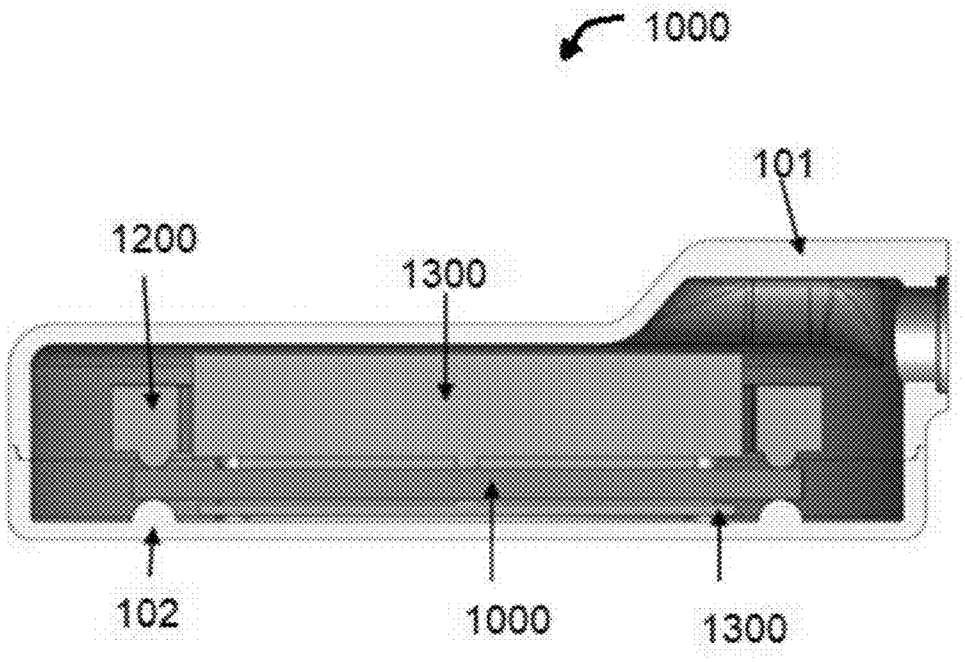

FIG. 19*a* to 19*e* show a bone anchored hearing aid device unit 1000, wherein the clamp system 1200 has two clamp elements 1210, 1212. Each clamp element 1210, 1212 comprises holder element 1220 as clamp part and a protrusion 1222 of the bottom housing part 102 as clamp counterpart. The holder elements are respectively welded to the bottom housing part 102. FIG. 19*a* shows the bone anchored hearing aid device unit 1000 in a cross-sectional view, while FIG. 19*b* shows the bone anchored hearing aid device unit 1000 in a top view without top housing part and without counterweight with several spot/circular laser welding 1214, FIG. 19*c* in the same angle of view with a counterweight. FIG. 19*d* shows the bone anchored hearing aid device unit 1000 with a closed housing and a dovel pin 1226. FIG. 19*e* shows the bone anchored hearing aid device unit 1000 in a section view along the resonance axis.

Figure 20:
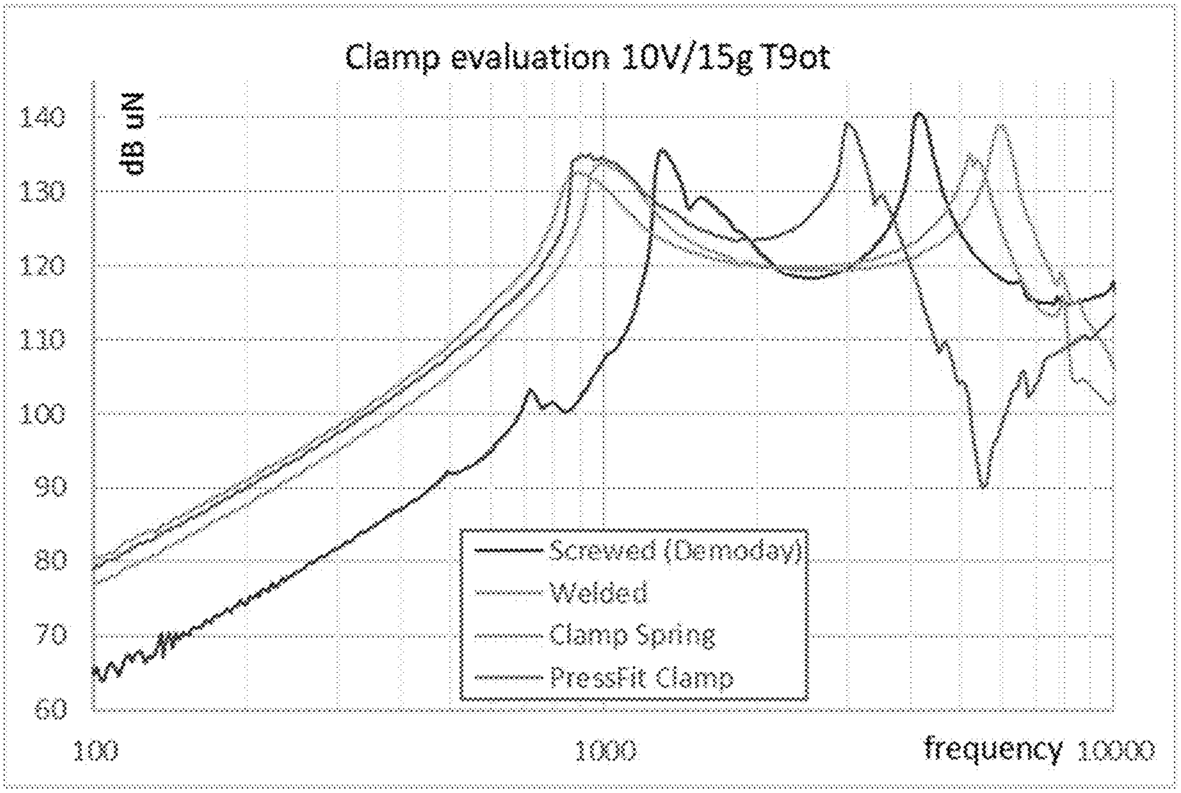
FIG. 20 show additional force output picture for the last 3 different clamping variations.

FIG. 20 shows a diagram with force output curves for the bone anchored hearing aid device unit of FIG. 17, for the bone anchored hearing aid device unit of FIG. 18, for the bone anchored hearing aid device unit of FIG. 19, and for the bone anchored hearing aid device unit of FIG. 15*a*-15*c*, wherein Y is depending on input voltage and material and is usually between 50 and 100 dB.

Figure 21:
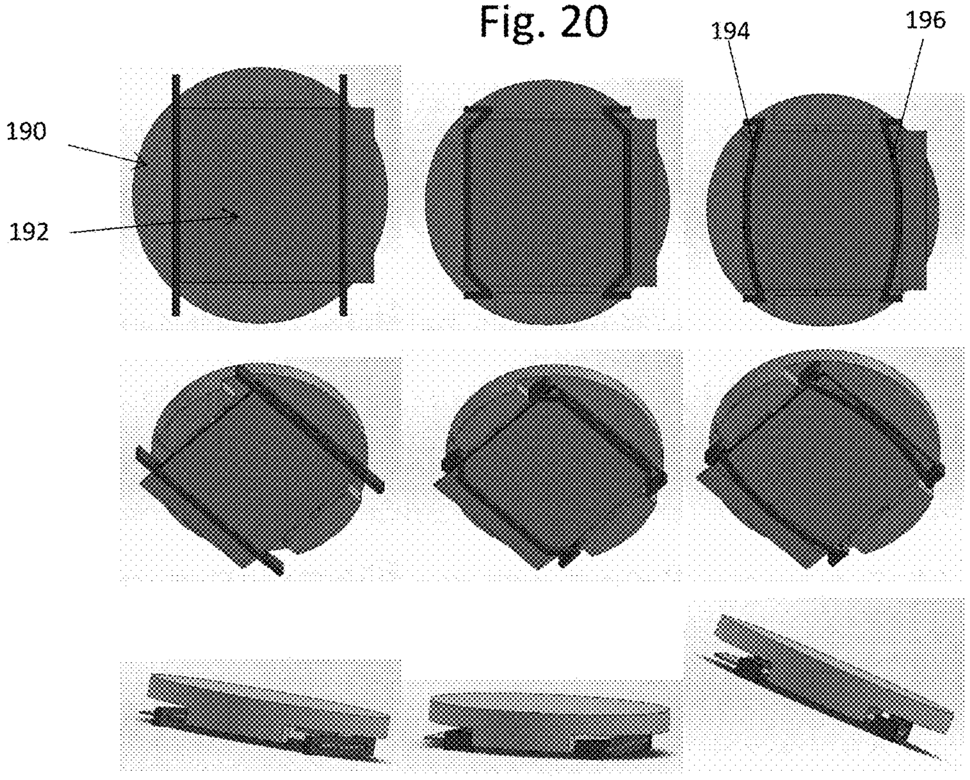
FIG. 21 shows several variations of a clamp system wherein the line of clamping is changed over the width of the plate piezo element of a bone anchored hearing aid device according to an exemplary embodiment of the disclosure.

FIG. 21 shows a counterweight 190, a clamp system and a piezo plate element 192 of a bone anchored hearing aid device unit, wherein the clamp system contacts the plate piezo element with a first contact line 194 and a second contact line 196. Several designs are shown, wherein the first contact line and the second contact line are straight over the width of the plate piezo element (left three drawings), wherein the first contact line and the second contact line have angles while extending over the width of the plate piezo element (middle three drawings), and wherein the first contact line and the second contact line being curved over the width of the plate piezo element (right three drawings).

Figure 22A:
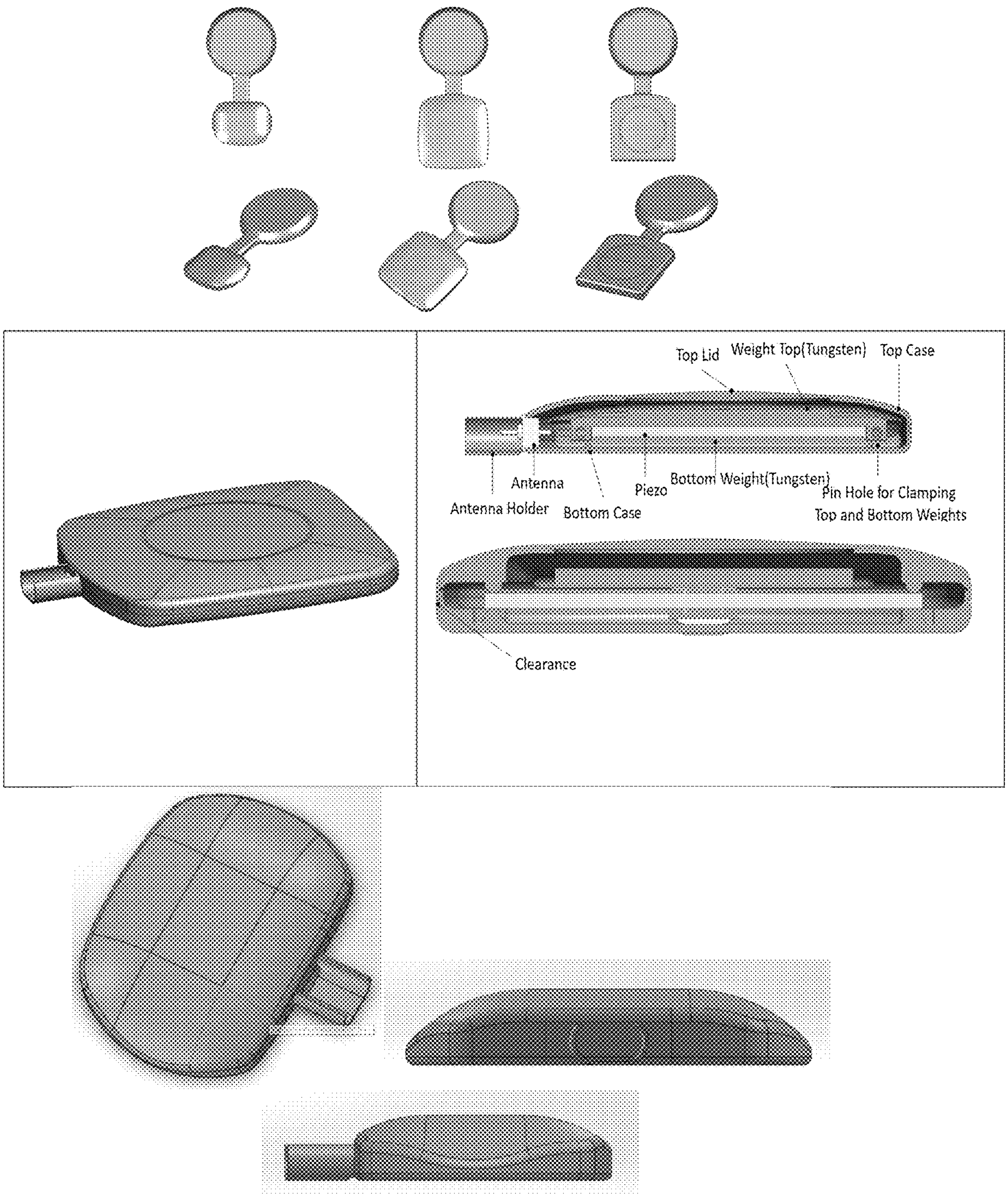
FIG. 22*a* to 22*c* show several shapes for a bone anchored hearing aid device unit of a bone anchored hearing aid device according to an exemplary embodiment of the disclosure with an antenna.
Figure 22B:
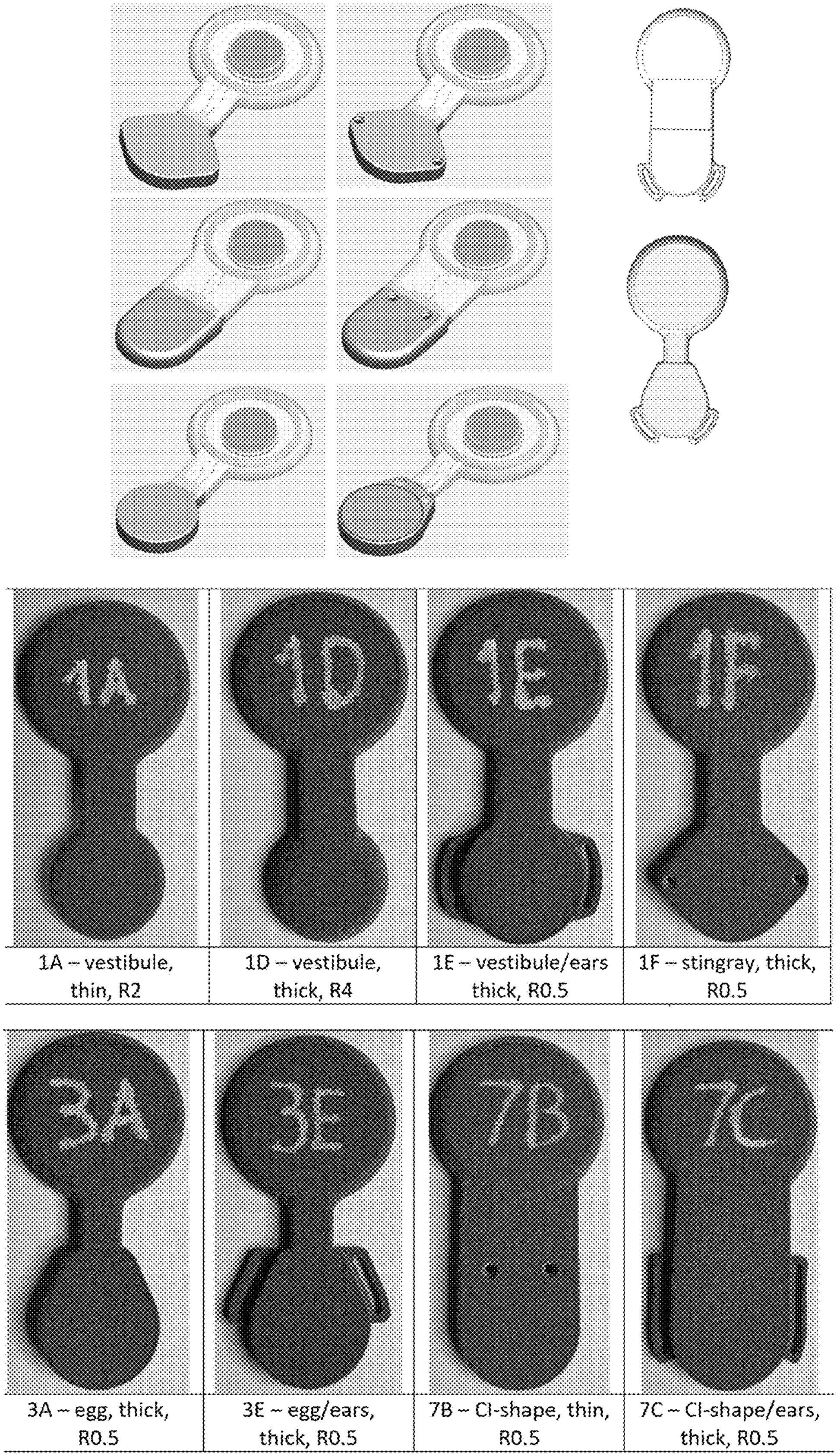
Figure 22C:
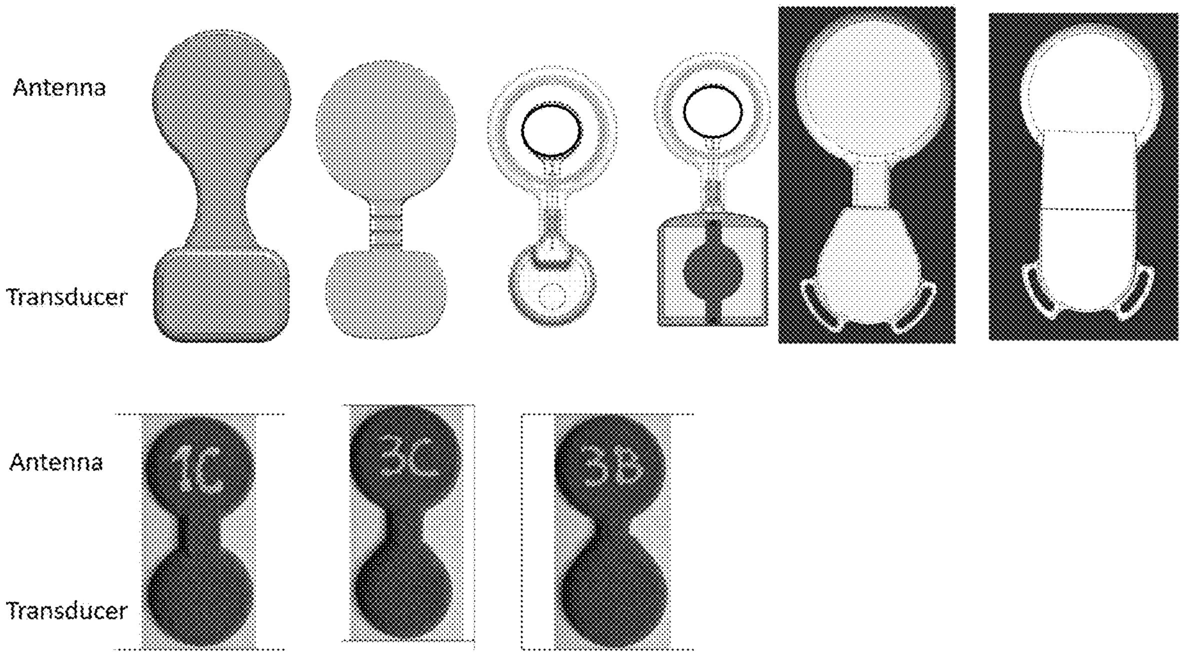

FIGS. 22*a*, 22*b* and 22*c* show several shapes for a bone anchored hearing aid device unit with an antenna. In these examples, the unit is an implant of a transcutaneous bone anchored hearing aid device 1, and the housing of the implant has rounded corners.

The housing has a first part (or first housing) wherein the actuator is located and a second part (second housing) wherein the coil and the magnet apparatus are located, the first part and the second part being interconnected.

The shape of the first part, seen from the above, can be e.g. round square or diamond, with rounded corners. The shape of the second part, seen from the above, can be e.g. round.

The shape of the housing of the implant allows optimizing energy transfer.

The invention claimed is:

1. Bone anchored hearing aid device unit comprising:
- a housing;
- an actuator having a first plate piezo element and a first counterweight; and
- a clamp system configured for attaching the actuator or part of the actuator to the housing;
- characterized
- in that the clamp system clamps the first plate piezo element of the actuator at a first clamp position at the first plate piezo element and at a second clamp position at the first plate piezo element; and
- in that the first counterweight is arranged on one side of one of the first plate piezo element and is positioned between the first clamp position and the second clamp position;
- wherein the actuator comprises a second counterweight, the first counterweight and the second counterweight being provided on said one side of the first plate piezo element.

2. Bone anchored hearing aid device unit according to claim 1, wherein the bone anchored hearing aid device unit is an implant unit configured to be implanted subcutaneously into a patient.

3. Bone anchored hearing aid device unit according to claim 1, wherein the first counterweight is arranged substantially centered with respect to the first clamp position and the second clamp position.

4. Bone anchored hearing aid device unit according to claim 1, wherein the housing has an upper housing part and a bottom housing part, wherein the upper housing part and the lower housing part form the receiving space for hosting the actuator, wherein the clamp system is configured for attaching the first plate piezo element of the actuator to the bottom housing part.

5. Bone anchored hearing aid device unit according to claim 1,
- wherein the actuator has the first plate piezo element and a second plate piezo element, the first plate piezo element and the second plate piezo element being provided with a joint base and in parallel, or
- wherein the actuator has the first plate piezo element and a second plate piezo element, the first plate piezo element and the second plate piezo element being provided independently next to each other.

6. Bone anchored hearing aid device unit according claim 5,
- wherein the first clamp position is arranged opposite to the second clamp position,
- wherein the first clamp position is arranged within a first peripheral zone of at least one of the first and second plate piezo element, and
- wherein the second clamp position is arranged within a second peripheral zone of at least one of the first and second plate piezo element.

7. Bone anchored hearing aid device unit according to claim 5,
- wherein the clamp system has a first clamp element and a second clamp element,
- wherein the first clamp element clamps at least one of the first and second plate piezo element at the first clamp position, and
- wherein the second clamp element clamps the first plate piezo element at the second clamp position.

8. Bone anchored hearing aid device unit according to claim 7, wherein the first clamp element and the second clamp element are welded or glued to the housing.

9. Bone anchored hearing aid device unit according to claim 5,
- wherein the clamp system contacts at least one of the first and second first plate piezo element with a first contact line and a second contact line, the first contact line and the second contact line being curved, or
- wherein the clamp system contacts the at least one of the first and second plate piezo element with a closed contact line, the closed contact line being curved.

10. Bone anchored hearing aid device unit according to claim 5,
- wherein the clamp system and the housing, preferably a bottom housing part, are configured for connecting via a screw connection, and
- wherein the screw connection also effects a clamping of at least one of the first and the second plate piezo element to the housing, preferably to the bottom housing part.

11. Bone anchored hearing aid device unit according to claim 1,
- wherein the clamp system has a clamp part contacting at least one of the first and second plate piezo element on a first side,
- wherein the clamp system has a clamp counterpart contacting the at least one of the first and second first plate piezo element on a second side opposite to the first side,
- wherein the clamp part contacts the first side with a closed contact line, and
- wherein the closed contact line connects the first clamp position and the second clamp position.

12. Bone anchored hearing aid device unit according to claim 1,
- wherein the clamp system and the housing, preferably a bottom housing part, are configured for connecting via a screw connection, and
- wherein the screw connection also effects a clamping of at least one of the first and the second plate piezo element to the housing, preferably to the bottom housing part.

13. Bone anchored hearing aid device unit according to claim 12, wherein the clamp system comprises a spring element for connecting the screw connection to the at least one of the first and the second plate piezo element.

14. Bone anchored hearing aid device unit according to claim 1, wherein the housing has a first housing part and a second housing part, the first housing part and the second housing part being configured to connect via a screw connection, the first housing part being provided with a spring element and the second housing part being provided with a protrusion, wherein the spring element is a clamp part of the clamp system, and wherein the protrusion is a clamp counterpart of the clamp system.

15. Bone anchored hearing aid device unit according to claim 1, wherein the clamp system has at least one screw and at least one holder element, and wherein the housing has a thread for connection with the screw of the clamp system.

16. Bone anchored hearing aid device unit according to claim 1, wherein the clamp system has at least two compression springs configured to be compressed between a first housing part and a second housing part.

17. Bone anchored hearing aid device unit according to claim 1, wherein the clamp system has at least two torsion springs.

* * * * *